US012400098B2

(12) United States Patent
Sarkis

(10) Patent No.: US 12,400,098 B2
(45) Date of Patent: *Aug. 26, 2025

(54) METHODS AND APPARATUS FOR DISPLAY AND DISPENSING OF A PRODUCT

(71) Applicant: Angilbert Sarkis, Oakdale, CA (US)

(72) Inventor: Angilbert Sarkis, Oakdale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/668,557

(22) Filed: May 20, 2024

(65) Prior Publication Data

US 2024/0311603 A1    Sep. 19, 2024

Related U.S. Application Data

(63) Continuation of application No. 17/591,163, filed on Feb. 2, 2022, now Pat. No. 12,014,231.

(60) Provisional application No. 63/284,895, filed on Dec. 1, 2021.

(51) Int. Cl.
G06K 19/07    (2006.01)

(52) U.S. Cl.
CPC .............. G06K 19/0723 (2013.01)

(58) Field of Classification Search
CPC ....... G06K 19/0723; G06Q 20/18; G07F 7/00
USPC .................. 235/492, 381, 487, 375; 194/210
See application file for complete search history.

(56) References Cited

U.S. PATENT DOCUMENTS 2,044,441 A    6/1936  Nuss
3,113,816 A *  12/1963 Hulsey .................... B65G 1/08
                                                    221/175

2009/0032367 A1* 2/2009  Anthome ................ G07F 5/18
                                                  194/210
2011/0160901 A1  6/2011  Abrams, Jr. et al.
2014/0312051 A1* 10/2014 Rose, Jr. ............... G07F 7/0609
                                                  221/124

FOREIGN PATENT DOCUMENTS

| CN | 102657383 | 11/2014 |
| DE | 555728    | 7/1932  |
| EP | 2457550   | 5/2012  |
| ES | 2232307   | 5/2005  |
| FR | 556194    | 7/1923  |
| RO | 110998    | 5/1996  |

(Continued)

OTHER PUBLICATIONS

PCT International Written Opinion and Search Report of the International Searching Authority for Application No. US2022/080729 (mailed Apr. 3, 2023, 9 pages.

*Primary Examiner* — Edwyn Labaze
(74) *Attorney, Agent, or Firm* — Campbell Stephenson LLP

(57) ABSTRACT

Methods and apparatus are disclosed that include a housing, a top, a base, a dispenser assembly, and embedded signage, where the apparatus is configured to store and dispense an item comprising a substantially circular cross-section, by virtue of the housing comprising a plurality of walls, each of which meets another of which at one or more edges, such that the plurality of walls form a top opening at a top edge of each such wall and a bottom opening at a bottom edge of each such wall. The dispenser assembly is operable to dispense the item from the housing, at least in part, by virtue of the dispenser assembly being configured to dispense the item due to the substantially circular cross-section of the item.

20 Claims, 17 Drawing Sheets

(56) References Cited

FOREIGN PATENT DOCUMENTS

| | | |
|---|---:|---|
| WO | 9410662 | 5/1994 |
| WO | 0033268 | 6/2000 |
| WO | 2020145992 | 7/2020 |

* cited by examiner

METHODS AND APPARATUS FOR DISPLAY AND DISPENSING OF A PRODUCT

CROSS-REFERENCE TO RELATED APPLICATIONS

The present patent application is a continuation of U.S. patent application Ser. No. 17/591,163, entitled "METHODS AND APPARATUS FOR DISPLAY AND DISPENSING OF A PRODUCT," filed Feb. 2, 2022, having A. Sarkis as inventor, and which claims benefit under 35 U.S.C § 119(e) of Provisional Patent Application No. 63/284,895, entitled "METHODS AND APPARATUS FOR DISPLAY AND DISPENSING OF A PRODUCT," filed on Nov. 30, 2021, and having Angilbert Sarkis as inventor. These applications are hereby incorporated by reference herein, in their entirety and for all purposes.

FIELD OF THE INVENTION

The present disclosure relates to the dispensing of products, and more particularly, to methods, computerized systems, and mechanisms that provide for the dispensing of items and the display of information regarding same.

BACKGROUND

The first modern coin-operated vending machines were introduced in London, England, in the early 1880s, dispensing postcards. The machines soon became a widespread feature at railway stations and post offices, dispensing envelopes, postcards, and notepaper. In 1887, the first company to deal primarily with the installation and maintenance of vending machines was founded in England. By 1893, one German chocolate manufacturer was selling its chocolate in approximately 15,000 vending machines. Later, various companies were formed to manufacture vending machines to sell not just chocolate, but cigarettes, matches, chewing gum, and soap products. The first vending machine in the United States was built in 1888, and sold gum on New York City train platforms. The idea of vending machines expanded in the U.S. during 1890's. This expansion continued throughout the last century, to the point where, today, such vending machines are ubiquitous, and offer anything from gum to electronic devices to automobiles.

Further, more product-specific vending machines have evolved from these modest beginnings. Marijuana vending machines originally found a niche market as a vending machine for selling or dispensing cannabis. Recently, thanks to changes in legislations across Europe and the UK, the United States, Canada, and other countries around the world, marijuana vending machines (also known as cannabis vending machines) can be found in many places, and sell a wide range of cannabis, hemp, and cannabidiol (CBD)-related products in countries where the legislation allows cannabis consumption, or CBD-only, legal cannabis across the global market. However, the display and sale of such products, as well as others, is complicated by products' sensitivity to their environment, control over the dispensing thereof, and other such complications.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
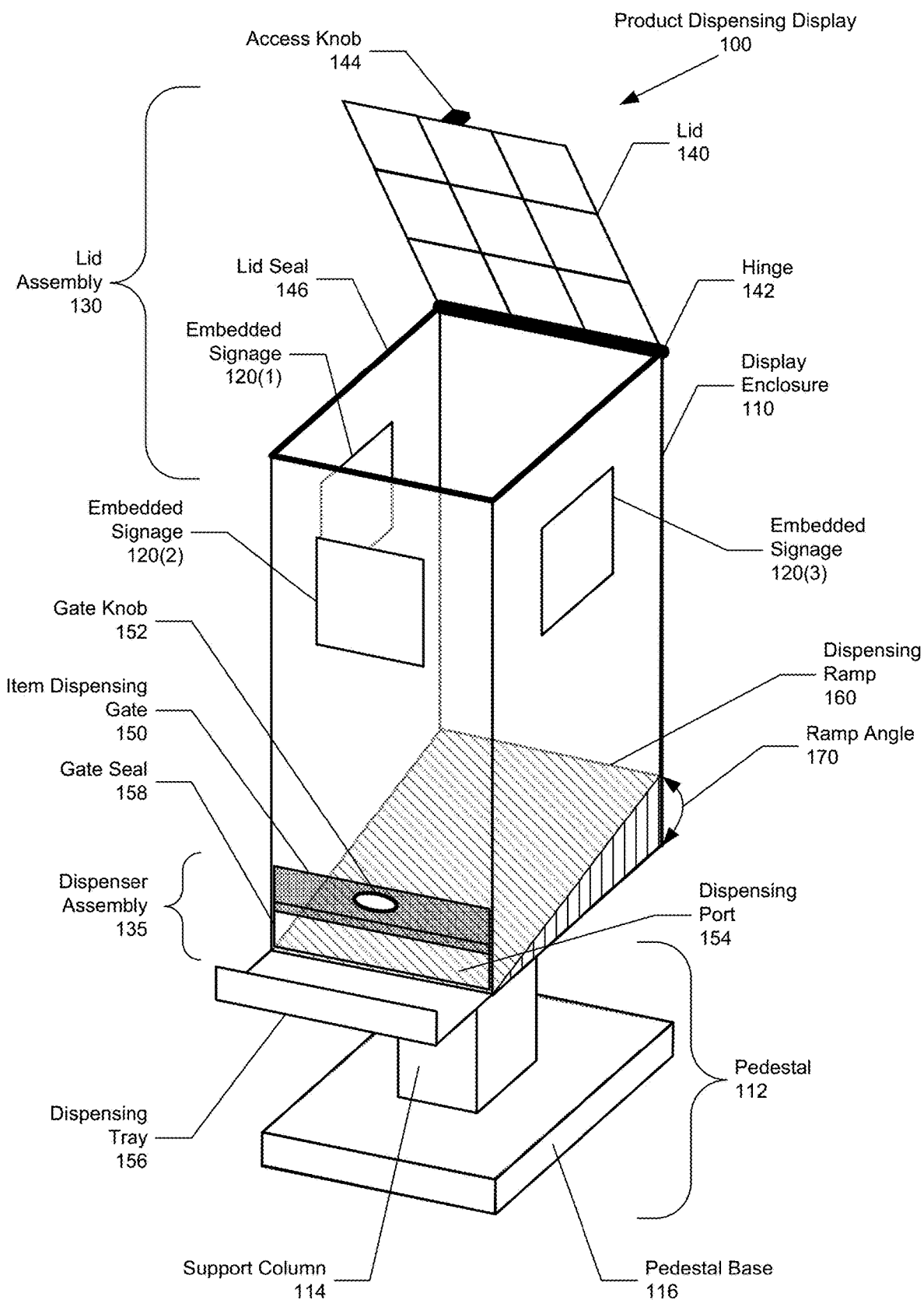
FIG. 1 is a simplified diagram illustrating components of a product dispensing display, according to embodiments of methods and systems such as those disclosed herein.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

Example Display Enclosures

FIG. 1 is a simplified diagram illustrating components of a dispensing and display system, according to embodiments of methods and systems such as those disclosed herein. FIG. 1 thus illustrates a product dispensing display 100. Product dispensing display 100 includes a housing (depicted in FIG. 1 as a display enclosure 110) that, in the embodiment depicted in FIG. 1, is formed by four rectangular walls (a front wall, a back wall, and two side walls (a left wall and a right wall, as viewed from in front of display enclosure 110)) that meet one another at their edges, as well as, in certain embodiments, a top (certain embodiments of which are referred to herein as a lid that seals along its edges at a top edge of each of the four walls depicted, as described subsequently) and opposite thereto, a base (which may include or support a dispensing ramp, as is also described subsequently) that is affixed to the walls and supported on a pedestal 112.

Pedestal 112 includes a support column 114 that supportively couples display enclosure 110 to a pedestal base 116. Pedestal base 116 provides stability to product dispensing display 100, and support column 114 supports display enclosure 110 at a level designed to situate the signage of display enclosure 110 at approximately an eye-level height (in addition to supportively coupling display enclosure 110 to pedestal base 116). Support column 114 can maintain the signage of display enclosure 110 (described subsequently) at this eye-level height based on a standard height of a retail countertop, or may be constructed using an adjustable mechanism, thereby facilitating adjustment of the height of product dispensing display 100 and its signage to the eye level of an average customer.

Display enclosure 110, in turn, includes embedded signage (e.g., depicted as embedded signage 120(1)-(3) in FIG. 1, and referred to in the aggregate as embedded signage 120). Embedded signage 120 can include printed materials and/or digital signage, and allows the commercial enterprise selling the items stored in display enclosure 110 to provide information regarding the items (e.g., to customers), prior to one or more of those items being dispensed. Further, the walls (as well as other features) of display enclosure 110 can be constructed of transparent material (e.g., glass, polymethyl methacrylate (also referred to as "acrylic" plastic, such as extruded acrylic and cell cast acrylic plastics), polycarbonate plastics, and the like), and, as noted, can be extruded, cast, or constructed from sheets of such materials bonded together using, for example, thermoplastic or other adhesives, heating, and/or other techniques.

As will also be appreciated, such materials need only be in a thickness sufficient to hold the items being stored and provide structure to product dispensing display 100, while allowing the items (or their containers) to be viewed by the customers, prior to the items being dispensed. That being the case, when using a transparent plastic, a wall thickness of 3 mm to 6 mm is typically preferable, particularly when the width is approximately 100 mm to approximately 150 mm, and depth is approximately 150 mm to approximately 250 mm, with a height of approximately 25 cm to approximately 75 cm. Viewed from above, the shape of display enclosure 110 can be, for example, rectangular, as shown in examples presented herein. The shape and width/depth dimensions of display enclosure 110 are driven, at least in part, by the shape of the items/their containers. For example, sufficiently cylindrical objects being most easily loaded into, stored in, and dispensed from an enclosure that is, viewed from above, rectangular in shape, while a spherical object can be dispensed from not only such a rectangular-shaped enclosure, but also from spherical, ellipsoidal, and other such shapes of enclosures, which are not depicted herein for the sake of simplicity and brevity, but which are also intended to be comprehended hereby.

Wall thicknesses such as those just described not only help to maintain the structure of display enclosure 110, but are also sufficiently thin to provide sufficient clarity when viewing the items contained within. As will be appreciated in light of the present disclosure, maintaining the customer's ability to visually examine the items for sale is advantageous both to the customer, allowing the customer to visually identify the items being sold easily and quickly, and to the merchant, by more effectively engaging the customer through such visual presentation. Further still, as will be appreciated in light of the present disclosure, the use of thinner materials reduces the cost of product dispensing display 100.

As is apparent from FIG. 1, display enclosure 110 is rectangular in shape when viewed from the top. This rectangular shape lends itself to dispensing, for example, cylindrical objects (or spherical objects, if box is width of one sphere). For items that are cylindrical (or are sold in cylindrical containers), one may not be able to readily read the information printed thereon, so signage can display, to aid shopper in identifying the item for sale and understand the information about the item. Display enclosure 110 can be dimensioned such that the items contained therein (or their containers) are able to move with a sufficient amount of freedom, such that, for example, the items are able to move down through display enclosure 110 such that those items can be dispensed from display enclosure 110. Typically, for cylindrical items (or items stored in cylindrical containers), a tolerance of approximately 1 mm to approximately 5 mm at each end of the cylindrical shape is sufficient to facilitate such motion.

Product dispensing display 100 includes not only display enclosure 110 and pedestal 112, but also a lid assembly 130 and a dispenser assembly 135. Lid assembly 130 is provided to facilitate the loading of items into the dispensing display 100 includes, in one embodiment, a lid 140 that is rotatably attached at a rear edge to a top edge of a back wall of display enclosure 110 by a hinge 142 (or other comparable mechanism that provides for opening lid 140 to allow one or more products to be loaded into display enclosure 110, and closed against one or more seals along a top edge of each of the walls of display enclosure 110 in order to seal the interior of display enclosure 110 against the ambient atmosphere external thereto), for example. In certain embodiments, lid 140 is rectangular in shape (e.g., as depicted in FIG. 1) and has a depth ("d") that is measured from a front edge of lid 140 to the back edge of lid 140. Given a sufficiently cylindrical items (or container thereof), the item (or its container) has a diameter ("D"). In such embodiments, hinge 142 can facilitate maintenance of the environmental (e.g., as by substantially maintaining, or facilitating the substantial maintenance of, an environmental parameter, such as those described subsequently) by virtue of maintaining a lid opening angle at a value of less than or equal to about arcsin (D/d). In so limiting the amount by which lid 140 is opened, hinge 142 (or other mechanism configured to limit the amount by which lid 140 is opened) helps to maintain the environment within product dispensing display 100, and so the freshness and salability of the items stored therein.

Lid 140 includes an access knob 144, which allows a clerk or other user to open product dispensing display 100 and load items to be dispensed into display enclosure 110. To maintain the freshness of items loaded into display enclosure 110, a lid seal 146 is attached to the top edge of display enclosure 110, and seals display enclosure 110 when lid 140 is closed.

Conversely, dispenser assembly 135 is provided to facilitate the dispensing of items to be purchased. Dispenser assembly 135 includes an item dispensing gate 150, which, in turn, has a gate knob 152 attached thereto, such that a customer is able to open item dispensing gate 150 and dispense an item to be purchased by actuating item dispensing gate 150 using gate knob 152. In so doing, the item being dispensed is dispensed through a dispensing port 154, into a dispensing tray 156, where the customer can access the item. As with lid assembly 130, a seal (e.g., depicted in FIG. 1 as a gate seal 158) is provided between item dispensing gate 150 and the body of display enclosure 110 to maintain the freshness of items contained in product dispensing display 100.

To facilitate the dispensing of cylindrical (or spherical) items or items in such containers, display enclosure 110 includes a dispensing ramp 160. Dispensing ramp 160, in certain embodiments, is designed to maintain a ramp angle 170 with respect to a base (e.g., horizontal) plane, and so promote the motion of the cylindrical or spherical items (or their containers) from within display enclosure 110, out through dispensing port 154. A determination as to the degree of ramp angle 170 is discussed subsequently, in connection with the description of FIG. 6. At this juncture, it is sufficient to note that, using a gravity-fed approach, the dispensing of cylindrical or spherical objects is facilitated by the fact that such objects are able to roll (and so be dispensed).

It will be appreciated in light of the present disclosure that the ability to see the items being dispensed is desirable. However, as noted, information printed on, for example, cylindrical objects may or may not be visible due to such, even when clear materials of sufficient thinness are employed, as a result of such objects' rotation while being dispensed. Thus, while the use of clear materials is advantageous for allowing customers to see the items being sold prior to their being dispensed (and subsequently purchased), such printed information may well not be visible to the customers. By providing signage as part of product display 100, product dispensing display 100 provides for ease of dispensing, while also providing necessary information to customers to which such items are dispensed. Further still, if clear materials are employed in the construction of product dispensing display 100, embedded signage 120 can be effected by inserting such signage into holders behind the walls of display enclosure 110. Such functionality can be advantageous, allowing such signage to be easily changed by, for example, printing new signage and replacing the old signage therewith (e.g., as by opening lid 140, removing existing signage, inserting the new signage, and closing lid 140). This functionality not only allows product dispensing displayed 100 to be used in dispensing different items, but also allows for pricing and other information to be easily updated.

Figure 2:
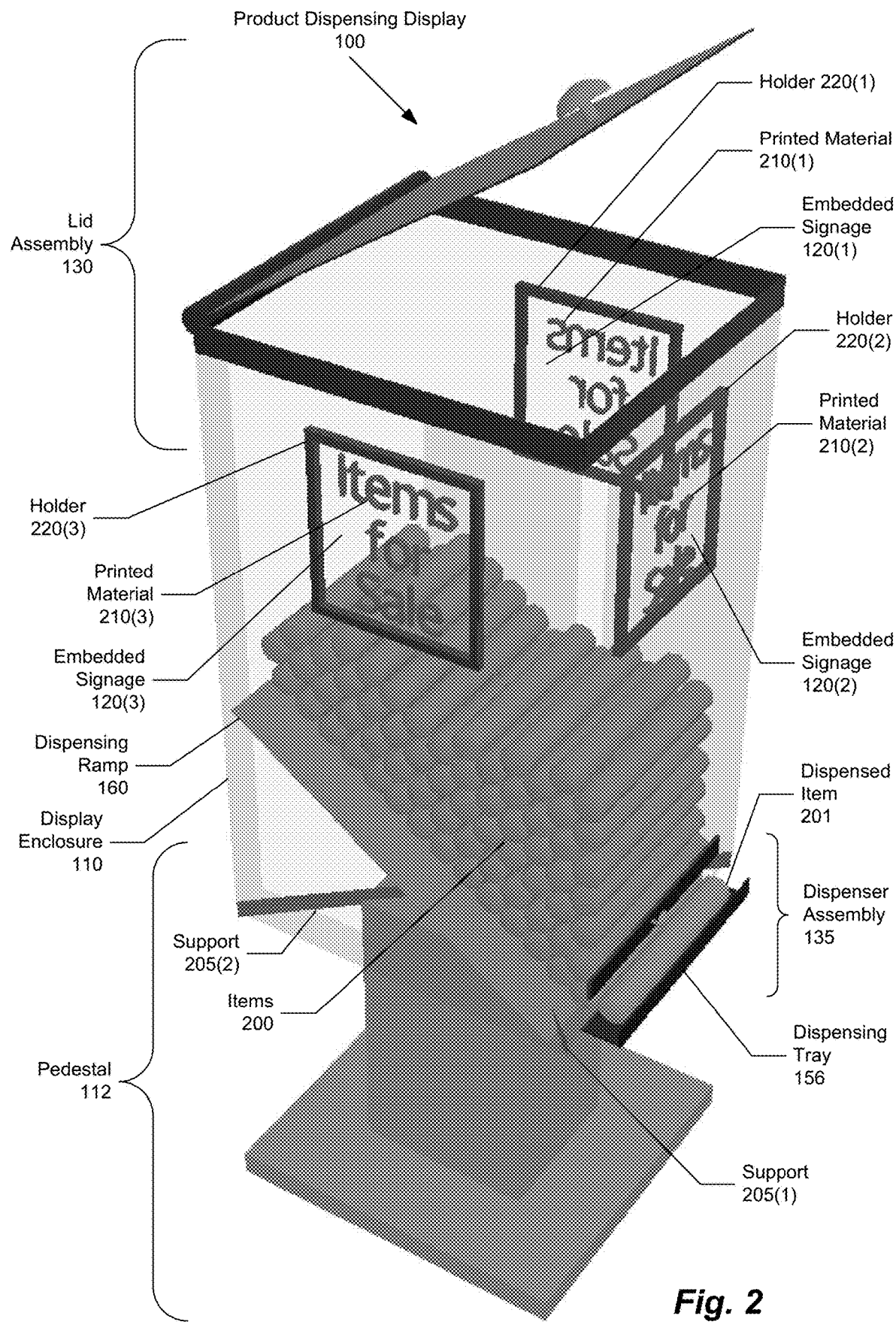
FIG. 2 is a perspective view illustrating components of a product dispensing display, according to embodiments of methods and systems such as those disclosed herein.
Figure 3:
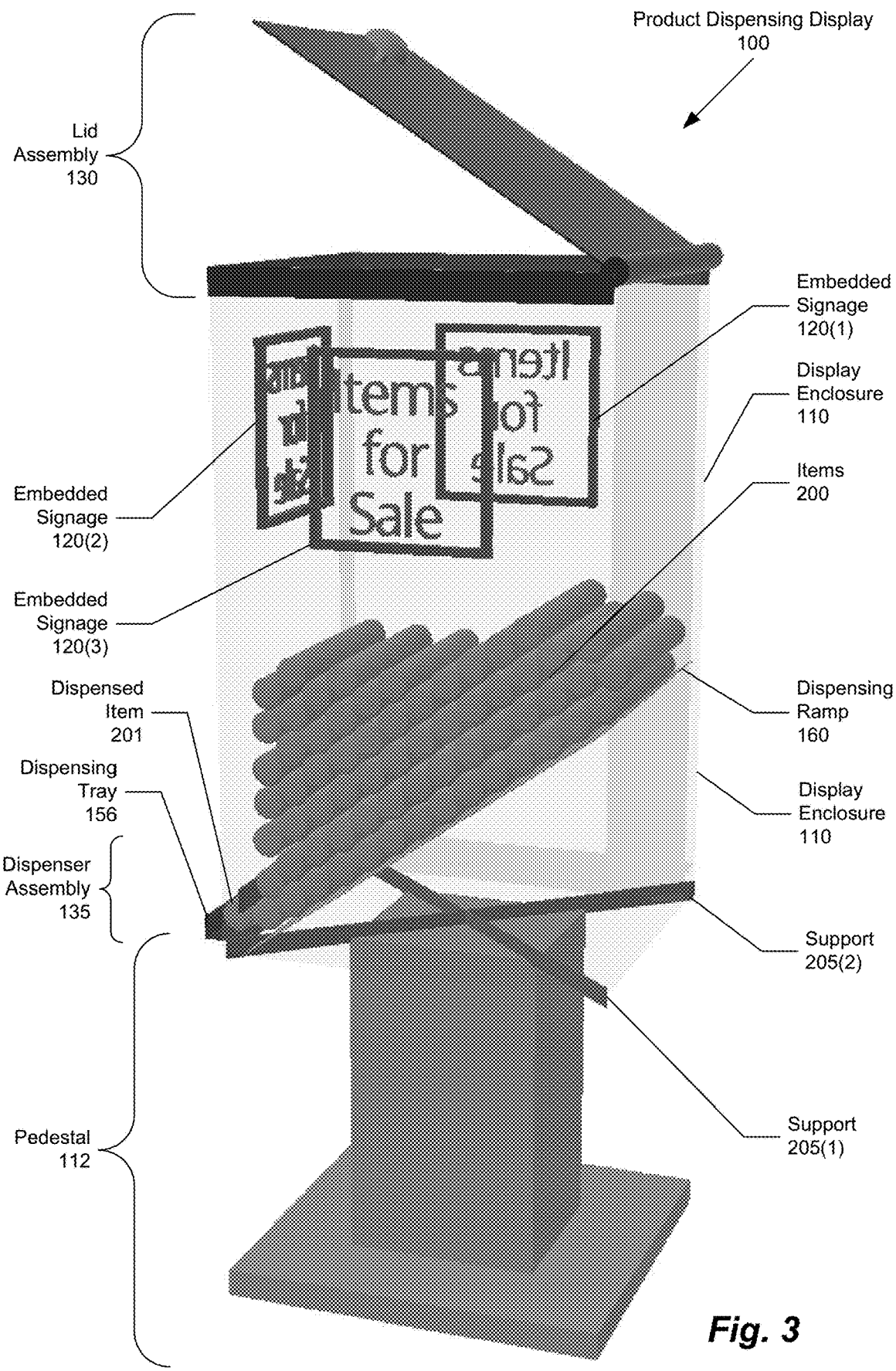
FIG. 3 is a perspective view illustrating components of a product dispensing display, according to embodiments of methods and systems such as those disclosed herein.
Figure 4:
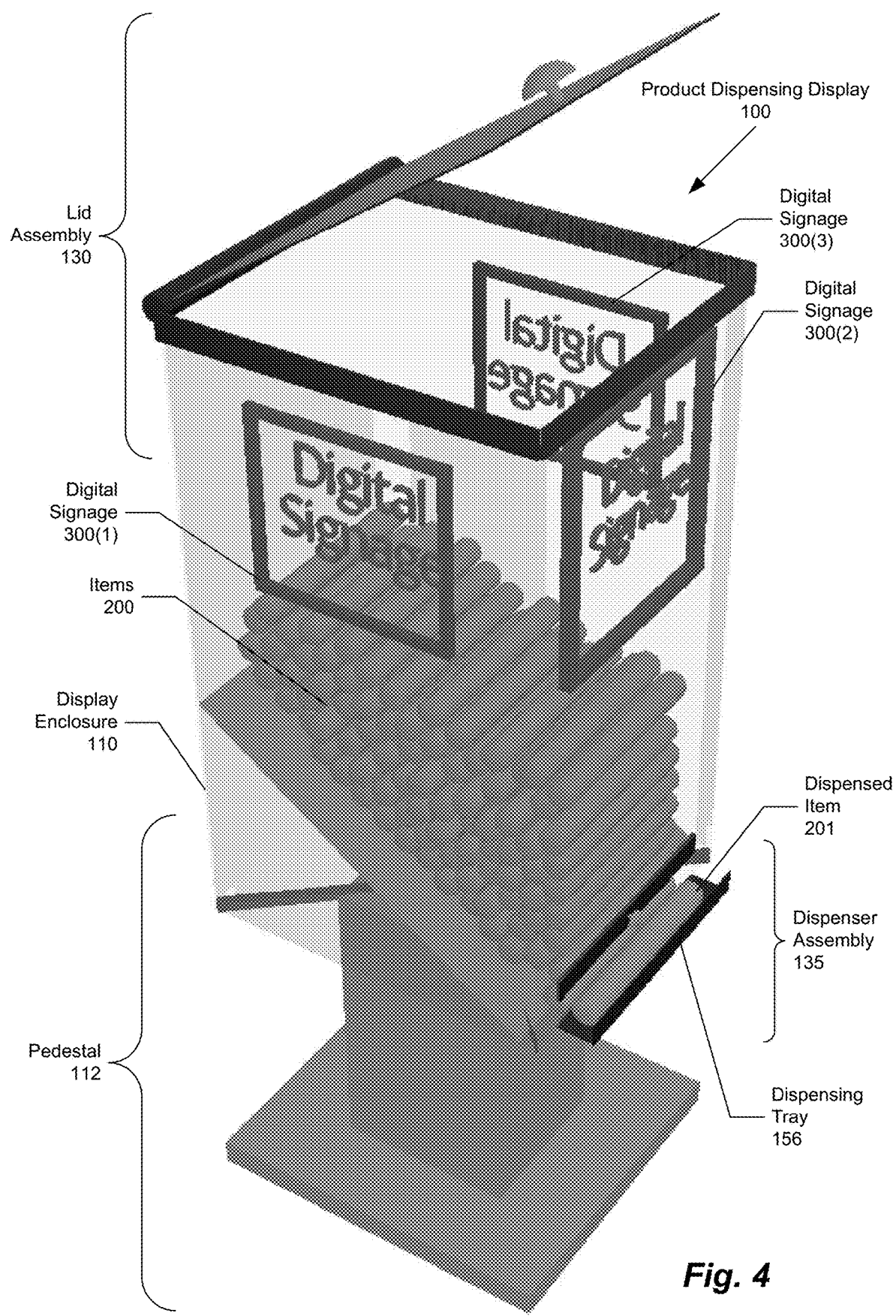
FIG. 4 is a perspective view illustrating components of a product dispensing display, according to embodiments of methods and systems such as those disclosed herein.
Figure 5:
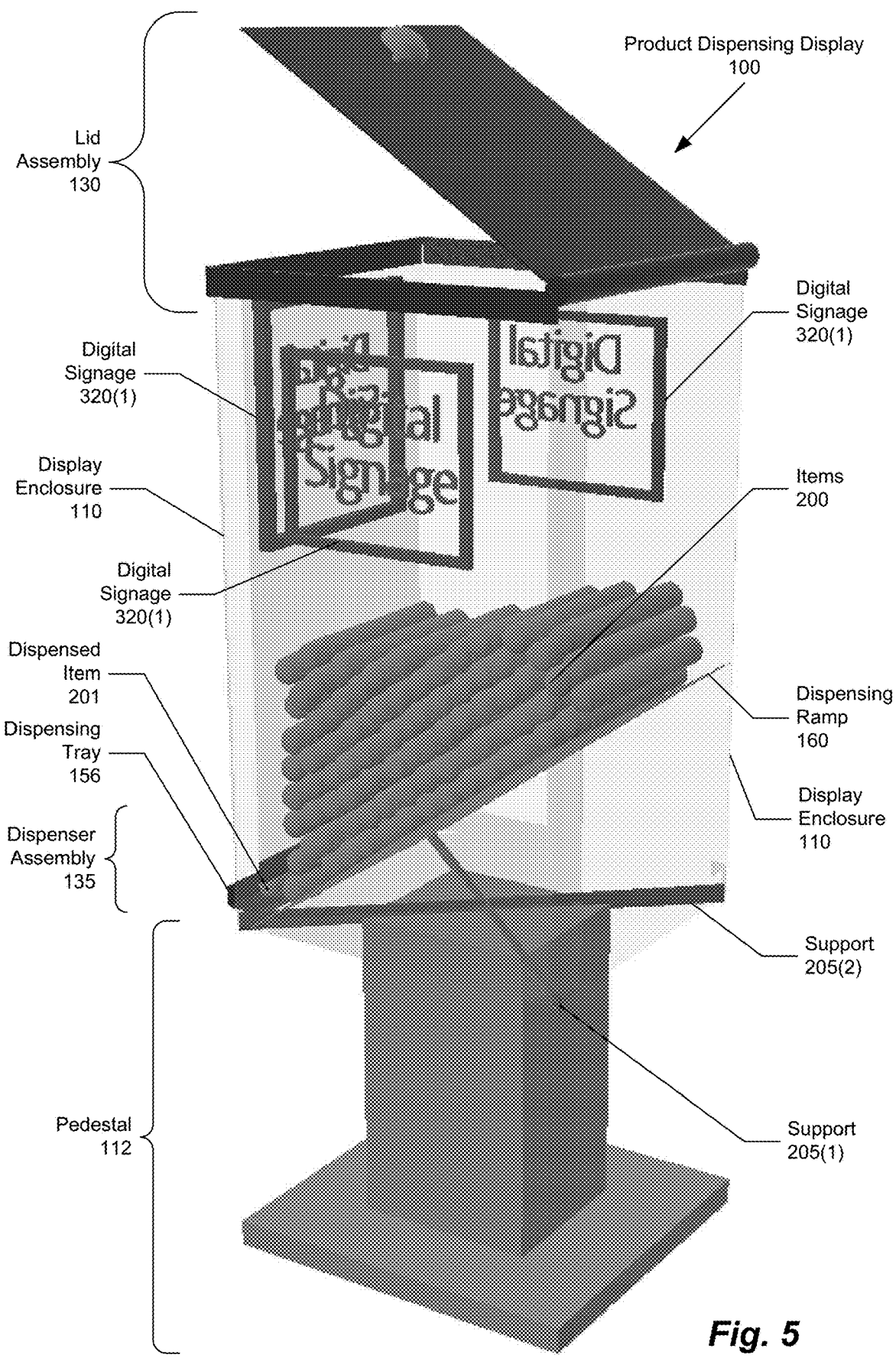
FIG. 5 is a perspective view illustrating components of a product dispensing display, according to embodiments of methods and systems such as those disclosed herein.

FIG. 2 is a perspective view illustrating components of a product dispensing display, according to embodiments of methods and systems such as those disclosed herein. The perspective view depicted in FIG. 2, as well as in FIGS. 3-5 show one embodiment of a product dispensing display such as product dispensing display 100 from various perspectives, in order to illustrate the manner in which cylindrical items can be stored in and dispensed from such a product dispensing display.

FIG. 2 thus depicts a product dispensing display such as product dispensing display 100 that has been loaded with a number of items (e.g., depicted FIG. 2 as items 200, which include an item that has been dispensed, a dispensed item 201) from a first perspective. As before, product dispensing display 100 includes display enclosure 110, as well as pedestal 112, which supports display enclosure 110 (in part, by way of supports 205(1)-(2), which are referred to in the aggregate as supports 205, and which are visible in the perspective illustration depicted in FIG. 2). As will be appreciated, supports 205 are simply examples of the kinds of structures that can be used to support display enclosure 110, and to more securely attach display enclosure 110 and pedestal 112 to one another. With regard to the stability and integrity of the structure of product dispensing displayed 100, it is to be appreciated that materials such as those described earlier need only be used in a thickness sufficient to contain the items being sold and provide the structure of product dispensing display 100, while allowing the items for their containers to be viewed by the customers. That being the case, when using a transparent plastic such as an acrylic or polycarbonate plastic, a thickness of 3 mm to 6 mm is typically preferable, particularly when the width is approximately 100 mm to approximately 150 mm, and depth is approximately 150 mm to approximately 250 mm, with a height of approximately 25 cm to approximately 75 cm, as noted. Such thicknesses not only help to maintain the structure of display enclosure 110, but are also sufficiently thin to provide sufficient clarity when viewing the items contained within, as also noted.

Lid assembly 130 and dispenser assembly 135 are attached to (or formed as part of) display enclosure 110. Also as before, embedded signage (e.g., embedded signage 120) is displayed on or through various sides of display enclosure 110. As will be appreciated from the perspective view illustrated in FIG. 2, portions of embedded signage 120 can be embedded within the structure of display enclosure 110. Alternatively or in combination there with, as is also depicted in FIG. 2, information in embedded signage 120 (e.g., "Items for Sale") can be added by inserting information printed on paper or card stock (e.g., depicted in FIG. 2 as printed materials 210(1)-(3), and referred to in the aggregate as printed materials 210) into a holder (e.g., depicted in FIG. 2 as holders 220(1)-(3), and referred to in the aggregate as holders 220) such as that depicted in FIG. 2.

By providing holders 220 and allowing a merchant (or that merchant's personnel) to replace printed materials 210 at their convenience, product dispensing display 100 provides a number of advantages. Among these are the presentation of the items for sale in a visually-engaging manner, allowing customers to see the items, without the need to be able to see any information printed on the items (or their containers), such information being presented more conveniently to customers by way of printed materials 210. Further, the ability to easily replace printed materials 210 provides both customers and merchants with the ability to maintain the information thus presented in a timely and efficient manner.

FIG. 3 is a perspective view illustrating components of a product dispensing display, according to embodiments of methods and systems such as those disclosed herein. As described in connection with FIG. 2, FIG. 3 depicts a product dispensing display such as product dispensing display 100, but from a second perspective. Here again, product dispensing display 100 includes display enclosure 110, as well as pedestal 112, which supports display enclosure 110, in part, by way of supports 205. Lid assembly 130 and dispenser assembly 135 are attached to (or formed as part of) display enclosure 110. Signage (e.g., embedded signage 120) is displayed on or through various sides of display enclosure 110. Also as before, embedded signage (e.g., embedded signage 120) is displayed on or through various sides of display enclosure 110. As will be appreciated from the perspective view illustrated in FIG. 2, portions of embedded signage 120 can be embedded within the structure of display enclosure 110. Alternatively or in combination there with, as is also depicted in FIG. 2, information in embedded signage 120 (e.g., "Items for Sale") can be added by inserting information printed on paper or card stock (e.g., printed materials 210) into a holder (e.g., holders 220) such as that depicted in FIG. 3.

FIG. 4 is a perspective view illustrating components of a product dispensing display, according to embodiments of methods and systems such as those disclosed herein. As before, FIG. 4 depicts a product dispensing display such as product dispensing display 100 that includes digital signage, from one perspective. Here again, product dispensing display 100 includes display enclosure 110, as well as pedestal 112, which supports display enclosure 110, in part, by way of supports 205. Lid assembly 130 and dispenser assembly 135 are attached to (or formed as part of) display enclosure 110.

Notably, however, the signage used to present information regarding items 200 is implemented using digital signage (e.g., depicted as digital signage 300(1)-(3), which is referred to in the aggregate as digital signage 300). Digital signage 300 can be implemented as an integral part of display enclosure 110, and a computer processing system (not shown) included, as well (e.g., as might be integrated into a support column of pedestal 112, such as support column 114). As will also be appreciated in light of the present disclosure, digital signage 300 may also present information received from a remote computing system (e.g., a server system). Examples of these and other such computer processing systems (e.g., Internet-of-Things (IOT), server, and other such systems) and their operation, both in providing information for display by and control of dispensing display 100, are described in connection with subsequent figures.

FIG. 5 is a perspective view illustrating components of a product dispensing display, according to embodiments of methods and systems such as those disclosed herein. As described in connection with FIG. 4, FIG. 5 depicts a product dispensing display such as product dispensing display 100 that includes digital signage, from another perspective. Once again, product dispensing display 100 includes display enclosure 110, as well as pedestal 112, which supports display enclosure 110, in part, by way of supports 205. Lid assembly 130 and dispenser assembly 135 are attached to (or formed as part of) display enclosure 110. Is also described in connection with FIG. 4, the signage used to present information regarding items 200 is implemented using digital signage (e.g., digital signage 300). Examples of such computer processing systems and their operation are, as noted, described in connection with subsequent figures.

Figure 6:
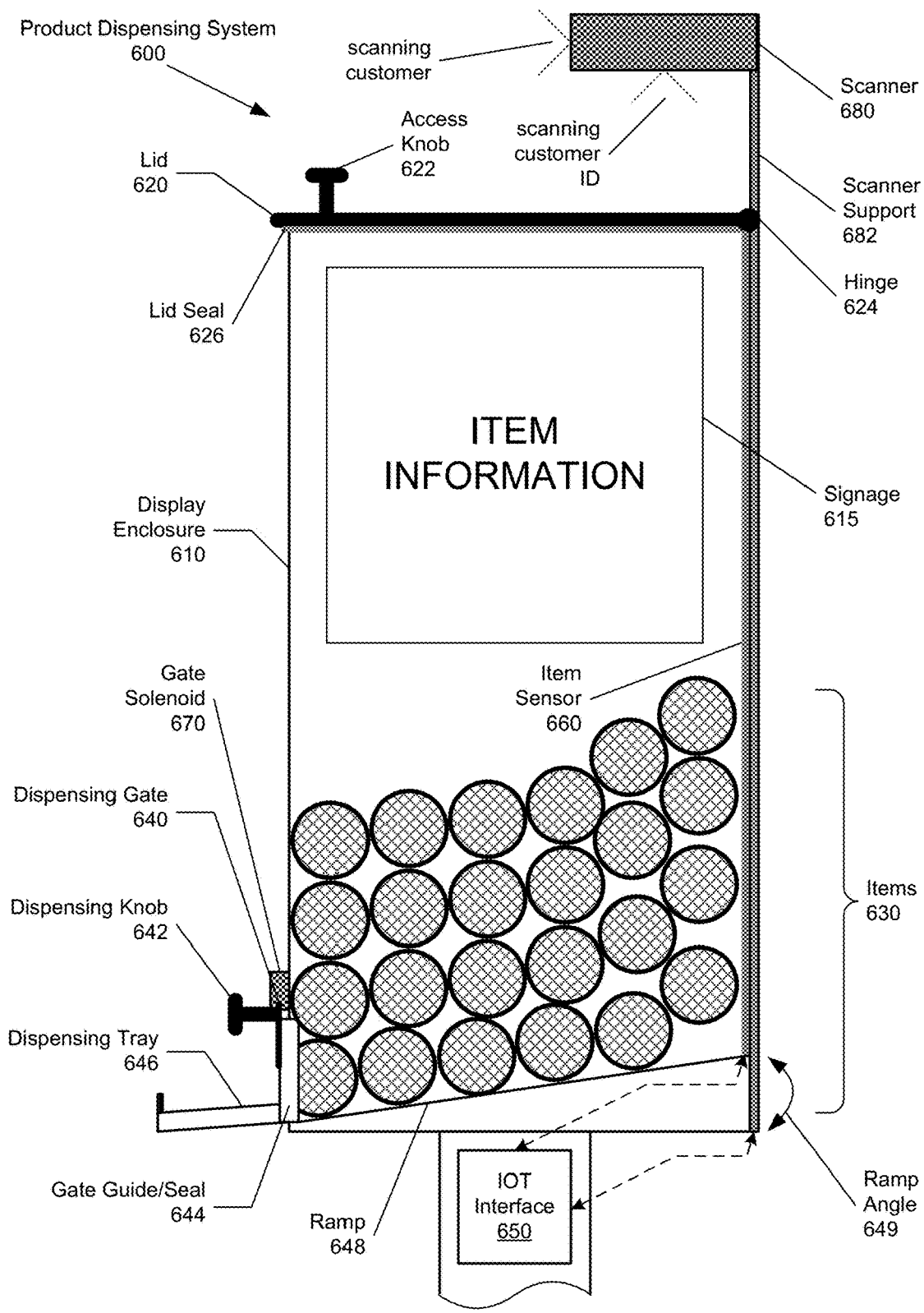
FIG. 6 is a simplified diagram illustrating a side view of components of a dispensing system, according to embodiments of methods and systems such as those disclosed herein.

FIG. 6 is a simplified diagram illustrating a side view of components of a product dispensing system, according to embodiments of methods and systems such as those disclosed herein. That being the case, FIG. 6 depicts a product dispensing system 600. As before, product dispensing system 600 includes a number of components comparable to (or the same as) components described in connection with earlier figures. Such features and components include a display enclosure 610 with signage 615. In the example depicted in FIG. 6, signage 615 can be embedded signage (e.g., printed materials) or digital signage, some or all of which may be integrated into one or more of the walls of display enclosure 610, depending on the implementation. For example, in the case in which one or more substantially clear walls of display enclosure 610 are clear, such walls can provide a pocket into which the aforementioned printed materials can be inserted, or such printed materials affixed to an interior surface thereof, thus allowing for such printed materials to be viewed from the exterior of display enclosure 610.

At (or near) a top of display enclosure 610 is a lid 620 with an access knob 622 that is rotatably coupled to display enclosure 610 by a hinge 624, which seals to display enclosure 610 by way of a lid seal 626. An interior of display enclosure 610 can be accessed for loading items (e.g., such as the items depicted in FIG. 6 as items 630) by lifting lid 620 using access knob 622, and inserting an appropriate number of items. As will be appreciated, upon returning lid 620 to its original position (e.g., the down position, against lid seal 626), a seal is maintained. Not only does the seal between lid 620 and display enclosure 610 provided by lid seal 626 maintain the freshness of items 630 (in the case in which items 630 are perishable), but such sealing also prevents the contamination of items 630, as by exposure to bacteria, viruses, contaminants, and the like. Such protection is particularly significant in situations in which items 630 are intended for human consumption (e.g., food, items intended for oral or nasal use, and the like).

In a similar fashion, product dispensing system 600 includes a dispenser assembly that, in turn, includes a dispensing gate 640 having a dispensing knob will 642 attached thereto, and sliding, for example, in a vertical motion within a gate guide and against a gate seal (e.g., depicted in FIG. 6 as a gate guide/seal 644). When actuated in this manner, dispensing gate 640 facilitates the dispensing of one or more of items 630 into a dispensing tray 646. In the implementation depicted in FIG. 6, the dispensing of items 630 into dispensing tray 646 by the actuation of dispensing gate 640 can be facilitated by way of gravity feed. Thus, in certain embodiments, items 630 are supported on a ramp will 648 that is maintained by the structure of display enclosure 610 and its associated supporting structures at a ramp angle 649 to the horizontal. In order to effectively and efficiently dispense cylindrical items/containers, ramp angle 649 (represented by the symbol "θ" below) can be determined, approximately, by:

$$\theta \approx \arccos(f/(\mu * M * g))$$

where:
f=frictional force to open gate, caused by the friction between gate and guide, caused by pressure from items (e.g., in newtons (N; kg-m-s$^{-2}$))
μ=coefficient of friction between the surfaces of the gate and the gate guide (unitless)
M=mass of the items (e.g., in kilograms (kg))
g=acceleration due to gravity (e.g., in meters per seconds squared (m-s$^{-2}$))

The foregoing assumes a ramp that is substantially flat. For purposes of the above equation:

$$M \approx m * n$$

where:
m=item mass (e.g., in kilograms (kg))
n=approximate number of items

The approximate number of items (n) can be estimated by:

$$n \approx ((d * (H - (h_r/2)))/(D^2))$$

where:
d=depth of enclosure (the dimension from the front of the enclosure to the back of the enclosure, for an enclosure that is rectangular, when viewed from above)
H=the height of the items (from the lowest item, awaiting dispensing at the gate, to the uppermost item in the enclosure)
hr=maximum height of ramp (at the rear of the enclosure, for a substantially flat ramp)
D=the diameter of the item (or its container)

The foregoing makes certain assumptions. For example, it is assumed that, because the items have a circular cross-section when viewed from the side, such items will settle into a configuration that is relatively space efficient (i.e., there are no spaces between items, when viewed from the side, that are relatively large (such that an item would fit into that space)). It is also assumed that, in general, the weight of the gate itself is sufficiently negligible and, conversely, there is no mechanical assistance in opening the gate (e.g., that gate actuation is not assisted by a spring that pulls the gate open, thus reducing the effort required to open the gate (and so overcomes a certain amount of resistance caused by the friction between gate and guide)). As will also be appreciated in light of the present disclosure, the items/their packaging need only be of a sufficiently cylindrical shape (sufficiently circular, viewed from the side). However, as will be appreciated, the less uniformly cylindrical the items/their packaging, the greater the ramp angle will be needed to properly dispense the items. The same can be said for the smoothness of the items'/their packaging's surface, with more irregular surfaces necessitating greater inclines.

As items are loaded and subsequently dispensed, it is advantageous for product dispensing system 600 to maintain information regarding such loading and dispensing, and, in certain situations, to control such dispensing, for example. The maintenance of such information and the control over the functioning of product dispensing system 600 can be accomplished using, for example, a computer processing system such as a server, which can obtain information from and obtain control over product dispensing system 600 by way of an interface such as an Internet-of-Things (IOT) interface 650 (e.g., a computer system such as a microcontroller system with a networking interface, configured to communicate with IOT server/controller). With regard to the loading of items, IOT interface 650 can provide information from an item sensor 660, which, in certain embodiments senses the level to which lay enclosure 610 is filled by items 630 (e.g., a height of the top-most item of items 630 in the spleen enclosure 610, a percentage of display enclosure 610 that is filled or is empty, or other such measures). In so doing, IOT interface 650 is able to provide such information to the requesting server. As items are loaded into display enclosure 610, information from item sensor 660 can be provided by IOT interface 650 to the requesting server (e.g., as by way of the wiring shown in FIG. 6 by dotted lines). In certain embodiments, items or their containers are tagged with radio-frequency identification (RFID) tags (RFID tags) that facilitate identification and tracking of the items, as the items are loaded into, stored in, and dispensed from product dispensing system 600. Such RFID tagging can be effected by associating such an RFID tag with an item by way of, for example, affixing an RFID tag on the item's container, including the RFID tag inside the container with the item, affixing the RFID tag on a wrapping in which the item is wrapped, or otherwise associating the RFID tag with the item. Item sensor 660 (e.g., implemented using an RFID sensor) can be used in this capacity, or another sensor capable of sending/receiving the requisite signals to/from such RFID tags can be employed. The use of RFID tags can also facilitate detection of information regarding each item (e.g., either by identifying the items themselves and/or retrieving more detailed information, whether retrieved from the RFID tag itself or retrieved from a server or other storage using the item's identifier (e.g., a unique identifier, such as a universal product code (UPC) stored in the RFID tag)). Information such as that described can be made available to the requesting server by IOT interface 650. Further still, the use of RFID tags can prevent the wrong items from being loaded into a product dispensing display (e.g., items that look similar (or identical), but are at different strengths, contain different ingredients, and so on; for example, one can imagine cannabis products that appear identical, but contain markedly different levels of THC), thereby making errors by clerks and/or other personnel less likely.

In a similar fashion, such a server can control the dispensing of items by communicating with IOT interface 650, which can then control a solenoid such as a gate solenoid 670. As can be seen in FIG. 6, gate solenoid 670 can be located such that actuation of dispensing gate 640 can be controlled. Such control may be desirable in situations in which items 630 are to be dispensed only to certain individuals, such as is the case with tobacco and other products. Approaches supported by product dispensing system 600 include receiving information regarding the individual desiring to purchase one or more of items 630 by way of a scanner 680 that is supported by a scanner support 682 and coupled to IOT interface 650 (e.g., as by way of the wiring shown in FIG. 6 by dotted lines). In such an implementation, scanner 680 can be designed to scan a customer's face and/or a customer's identification (e.g., a government-issued identification card such as a driver's license or passport). By interacting with scanner 680 via IOT interface 650, a server or other computing system is able to verify that a customer meets the applicable criteria for dispensing the given items and control gate solenoid 670 in a manner that avoids dispensing one or more of items 630 to an individual to whom such items are not to be dispensed. Further still, the results of such scanning can be transmitted via IOT interface 650 to the server in question, to record information regarding such customers (whether allowed or not), and so provide additional safeguards against the risk of, for example, purchases by underage individuals. Still further, such control can be provided to the merchant's clerk or other personnel. In such an embodiment, items are available to be dispensed only when a clerk hits a button or actuates some other mechanism that then allows a shopper to extract an item from product dispensing system 100.

By detecting the loading and dispensing of items, IOT interface 650 can also send information to a server or other such computer system, in order to allow for the determination of sales parameters for the items being dispensed (or make such determinations using its own processes). Such information can be used to determine the rate of sale of the items, the number of items in the given product dispensing system (or in multiple such product dispensing systems), the length of time the inventory of such items in a given location or multiple locations can be expected to last, and other such parameters. In so doing, such systems are also able to make adjustments to the price of the items (or even the next item to be dispensed) in a given product dispensing system, and to immediately display such prices on the signage of the given product dispensing system(s). Such determination and display of dynamic pricing information can provide pricing that facilitates optimization of one or more of sales volume, profits, inventory days (or other such inventory management measure), and other such business parameters.

Figure 7:
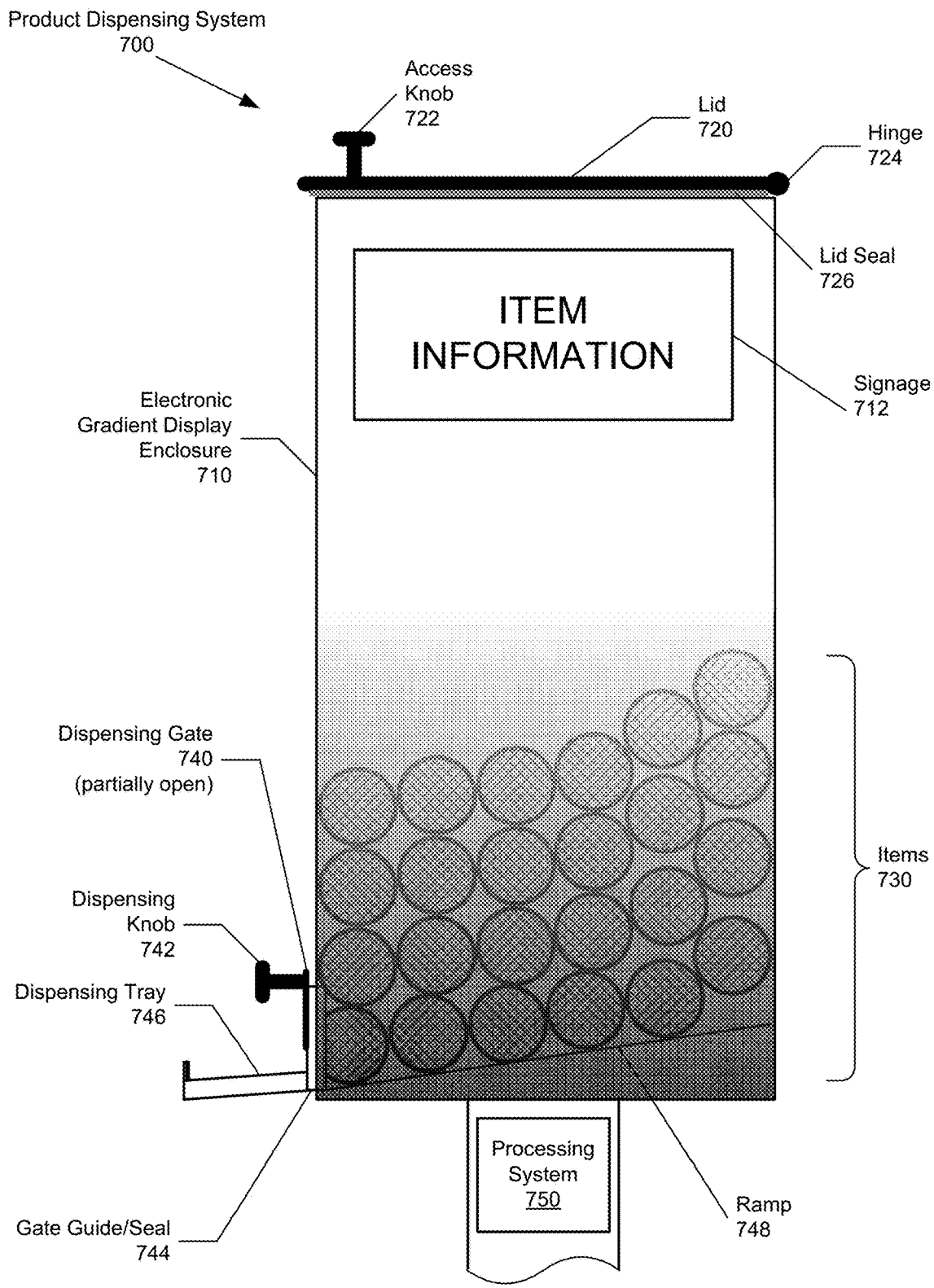
FIG. 7 is a simplified diagram illustrating a side view of components of a dispensing system, according to embodiments of methods and systems such as those disclosed herein.

FIG. 7 is a simplified diagram illustrating a side view of components of a product dispensing system, according to embodiments of methods and systems such as those disclosed herein. That being the case, FIG. 7 depicts a product dispensing system 700. As before, product dispensing system 700 includes a number of components comparable to (or the same as) components described in connection with earlier figures. Such features and components include a display enclosure (e.g., depicted in FIG. 7 as an electronic gradient display enclosure 710) with signage 712. In the example depicted in FIG. 7, signage 712 can be embedded signage (e.g., printed materials) or digital signage, some or all of which may be integrated into one or more walls of display enclosure 710, depending on the implementation.

At (or near) a top of electronic gradient display enclosure 710 is a lid 720 with an access knob 722 that is rotatably coupled to display enclosure 710 by a hinge 724, which seals to display enclosure 710 by way of a lid seal 726. An interior of display enclosure 710 can be accessed for loading items (e.g., such as the items depicted in FIG. 7 as items 730) by lifting lid 720 using access knob 722, and inserting an appropriate number of items. As will be appreciated, upon returning lid 720 to its original position (e.g., the down position, against lid seal 726), a seal is maintained. Not only does the seal between lid 720 and display enclosure 710 provided by lid seal 726 maintain the freshness of items 730 (in the case in which items 730 are perishable), but such sealing also prevents the contamination of items 730, as by exposure to bacteria, viruses, contaminants, and the like. Such protection is particularly significant in situations in which items 730 are intended for human consumption (e.g., food, items intended for oral or nasal use, and the like).

In a similar fashion, product dispensing system 700 includes a dispenser assembly that, in turn, includes a dispensing gate 740 having a dispensing knob will 742 attached thereto, and sliding, for example, in a vertical motion within a gate guide and against a gate seal (e.g., depicted in FIG. 7 as a gate guide/seal 744). When actuated in this manner, dispensing gate 740 facilitates the dispensing of one or more of items 730 into a dispensing tray 746. In the implementation depicted in FIG. 7, the dispensing of items 730 into dispensing tray 746 by the actuation of dispensing gate 740 can be facilitated by way of gravity feed. Thus, in certain embodiments, items 730 are supported on a ramp 748 that is supported by (or integral to) a base that is, in turn, supported by the structure of display enclosure 710 and its associated supporting structures, as described in connection with FIG. 6.

As noted, it is advantageous for product dispensing system 700 to maintain information regarding the loading and dispensing of items 730. To this end, product dispensing system 700 can include a computer system (e.g., depicted in FIG. 7 as a processing system 750) to perform such information maintenance. Moreover, processing system 750 can perform other functions including embodiments of signage 712 that employee a digital signage display, in the manner noted in connection with FIG. 6. It will be appreciated that communication connections, as well as sensors and other features are not shown or discussed in connection with FIG. 7 and certain of the other figures for the sake of simplicity.

Further, in contrast to the display enclosures described earlier here in electronic gradient displaying closure 710 provides the ability to shade the walls of electronic gradient displaying closure 710 under the control, for example, of processing system 750, as can be seen in FIG. 7. As can be seen in FIG. 7, electronic gradient displaying closure 710 can, under the control of processing system 750, control shading in a manner that protects items 730 against exposure to electromagnetic radiation such as visible light, ultraviolet light, and other wavelengths that can result in the spoilage of items 730. Moreover, processing system 750, by sensing the level of items 730 in electronic gradient displaying closure 710, can adjust the tinting of electronic gradient displaying closure 710 to protect items 730, while allowing at least some of those items to be visible to customers. This can be accomplished, for example, using electrochromic tinting, which can be manufactured as an integral part of electronic gradient display enclosure 710, or can be applied as a step in the construction of product dispensing system 700. Such electrochromic tinting can be manufactured as a gradient (with some comparatively large number of "cells" (addressable, e.g., in the manner of, for example, the pixels of a liquid crystal display (LCD) screen, whether addressed singly, to create a smooth gradient, or in groups)), by integrating a number of separately-addressable "bands" (e.g., strips of LCD material), or in some other configuration that facilitates protecting items 730 from the wavelengths of interest (e.g., the wavelengths noted elsewhere herein), at least to an acceptable extent.

In so doing, areas of electronic gradient displaying closure 710 can "follow" the level of items 730, as items 730 are loaded into and dispensed from electronic gradient displaying closure 710. This allows product dispensing system 700 to reduce spoilage of items 730, while allowing customers visual access thereto. Further, it will be appreciated that, given that the ones of items 730 loaded most recently are the uppermost of such items, the various ones of items 730 can be protected in a relatively uniform fashion, with the ones of items 730 having been stored in electronic gradient displaying closure 710 the longest being at the bottom of items 730 and so being afforded the greatest protection by the tinting of electronic gradient displaying closure 710. It will be further appreciated that electronic gradient displaying closure 710 can, under the control of processing system 750, achieve the gradient shading shown in FIG. 7 by way of electronically-controlled tinting, coloration, opacity, and other such characteristics of the walls of electronic gradient display enclosure 710. Further still, when signage 712 is implemented using digital signage, the gradient shading and the characteristics of the information displayed on signage 712 can be coordinated to improve customer engagement (e.g., if electronic gradient display enclosure 710 is dark in the area in which signage 712 is located, signage 712 can be made to display information on a lighter background, and vice versa; a number of other such ways in which electronic gradient display enclosure 710 and signage 712 can be coordinated to improve customer engagement can be conceived, in view of the present disclosure).

Considerations affecting the "freshness" of items 730, such as exposure to ultraviolet (UV) and visible light, ambient atmospheric conditions, and other such environmental factors are of particular concern when the items in question are cannabis products (e.g., marijuana cigarettes). In this regard, it can be desirable to control one or more environmental parameters affecting the environment within the given display enclosure (e.g., exposure to radiant energy, temperature, humidity, contaminants, pathogens, and so on) by substantially maintaining one or more such environmental parameters at certain values (or within certain ranges of values) to maintain items stored therein in an acceptable condition for sale and subsequent use. For example, marijuana should be stored at a relative humidity of 49%-70%, and preferably at a relative humidity of 55%-65%. More preferable still is the storage of marijuana at a relative humidity of 59%-63%, and is best kept at a relative humidity of 61%. Storing marijuana at higher relative humidity runs the risk of trapping moisture, which can lead to the growth of mold, while lower relative humidity can cause the marijuana to dry out, reducing efficacy (an important consideration in both commercial and medical settings). To this end, ASTM International (formerly the American Society for Testing and Materials) has promulgated a standard (ASTM D8197-18, the Standard Specification for Maintaining Acceptable Water Activity ($a_w$) for Dry Cannabis Flower) in a range of 0.55 to 0.65, making the storage of such products a standardized affair. The proper humidity can be maintained, for example, through the inclusion of a humidifier (not shown in FIG. 7, for the sake of simplicity). Such a humidifier can be passive (e.g., wetted floral foam, superabsorbent polymers, silica beads, humidipaks, and the like) or active (e.g., electronic humidifiers). While passive humidifiers are simpler (typically, simply being replaced periodically), active humidifiers include temperature and humidity sensors, and can be controlled by a computing system such as processing system 750.

As alluded to above, temperature is also a consideration. Marijuana should be stored at a temperature of approximately 50° F. (approximately 10.0° C.) to 90° F. (approximately 32.2° C.), preferably at a temperature of approximately 60° F. (approximately 15.5° C.) to 80° F. (approximately 26.7° C.), and most preferably at a temperature of approximately 70° F. (approximately 21.1° C.). It will be appreciated that, in light of the present disclosure, various mechanisms (fans, filtered air sources, and the like) can be included in product dispensing system 700, under the control of processing system 750, in order to maintain the environment within electronic gradient display enclosure 710 in a manner that is sufficiently appropriate to maintaining items 730 in an acceptable condition (e.g., in a saleable condition).

Display enclosures such as those described herein are able to better maintain such environments, and so meet such standards. To this end, not only can one or more environmental sensors such as temperature sensors (not shown, for purposes of simplicity) and/or humidity sensors (not shown, for purposes of simplicity) be included as part of product dispensing system 700 to maintain the aforementioned environmental parameters of temperature and humidity, but solenoid-controlled valves capable of coupling the internal environment to the external ambient environment (also not shown, for purposes of simplicity), fans (also not shown, for purposes of simplicity), heaters (also not shown, for purposes of simplicity), humidification sources (whether by exposure of a passive source of humidity, or an active humidifier; also not shown, for purposes of simplicity), dehumidifiers (also not shown, for purposes of simplicity), and other such mechanisms can be included as part of product dispensing system 700, and which, under the control of processing system 750, can provide additional mechanisms to facilitate the maintenance of the internal environment of product dispensing system 700.

Further still, using a mechanism such as the RFID tagging described earlier herein, processing system 750 can determine the appropriate values/ranges of one or more environmental parameters to maintain for the given item. For example, information (stored locally and/or remotely) can be accessed using an item identifier stored in an item's RFID tag (though it will be appreciated that an alternative to such a tag would be the identification of an item using a UPC label, though the environmental information would then need to be retrieved from local and/or remote storage). In fact, some or all of such environmental parameter information can be retrieved from the item's RFID tag itself. In cases in which multiple types of items (needing different values/ranges of environmental parameters) are stored in product dispensing system 700, processing system 750 can determine values/ranges of environmental parameters appropriate to the various item types stored in product dispensing system 700 (e.g., as by determining the overlap of acceptable temperature and humidity ranges), as well as provide an alert as to different item types having been loaded into product dispensing system 700 (e.g., using signage 712, sending a message to a remote server, and/or the like).

In addition to the direct control of environmental parameters using mechanisms such as those just described, a product dispensing system such as product dispensing systems 700 can, at least to some degree, control the duration of a given item's storage by affecting the rate at which such items are dispensed. For example, with regard to maintaining the freshness of items 730, processing system can, by accessing a server or on its own, alter the price of items 730, if one or more of items 730 are determined to be at risk of spoilage and so are in need of being sold relatively quickly. Such urgency can also be reflected in the signage displayed by signage 712 (e.g., by a flashing background or other change to signage 712, to alert customers to such pricing), in effort to attract attention and sell items 730 more quickly.

Figure 8:
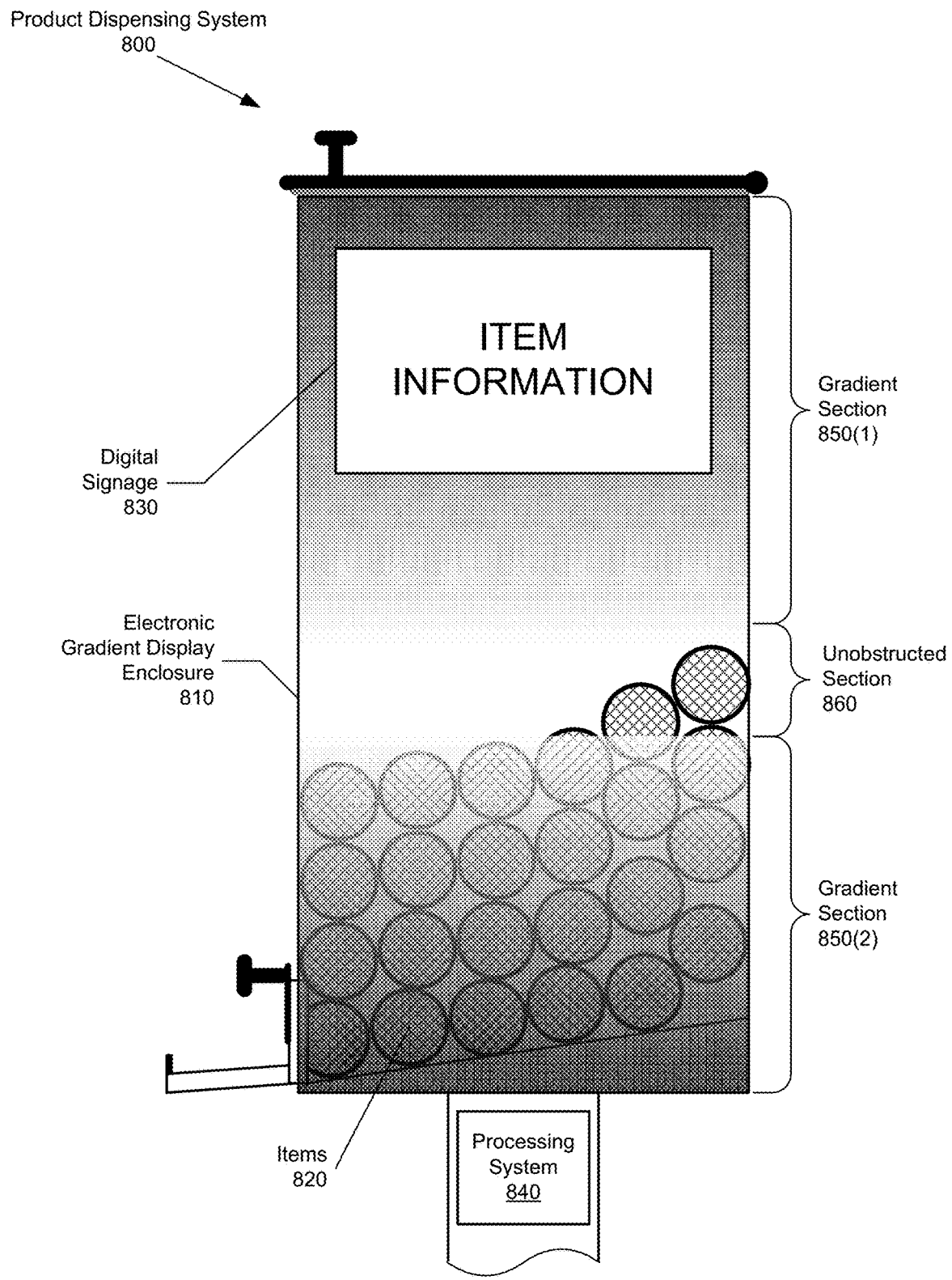
FIG. 8 is a simplified diagram illustrating a side view of components of a dispensing system, according to embodiments of methods and systems such as those disclosed herein.

FIG. 8 is a simplified diagram illustrating a side view of components of a product dispensing system, according to embodiments of methods and systems such as those disclosed herein. That being the case, FIG. 8 depicts a product dispensing system 800. As before, product dispensing system 800 includes a lid assembly and a dispenser assembly such as those described in previous figures.

Product dispensing system 800 also implements an electronic gradient displaying enclosure 810 (also referred to as an electronic display gradient enclosure (an EDGE enclosure)), which is supported by a pedestal such as that described in connection with earlier figures. These and other features of electronic gradient displaying closure 810 supports the loading, storage, and dispensing of one or more of items 820. Electronic gradient displaying closure 810 also includes digital signage 830, under the control of a processing system 840. In the embodiment depicted in FIG. 8, electronic gradient displaying closure 810 is configured to implement multiple gradient sections (e.g., depicted in FIG. 8 as gradient sections 850(1)-(2), and referred to in the aggregate as gradient sections 850) and, as a result, one or more unobstructed sections (e.g., depicted in FIG. 8 as an unobstructed section 860). It is to be appreciated, in light of the present disclosure, that gradient sections 850 and unobstructed section 860 are intended only as examples, and that other configurations of obstructed, gradient, and unobstructed sections are possible (e.g., a circular unobstructed section that "floats" from one of items 822 another thereof, unobstructed sections of different shapes, multiple unobstructed sections (whether static or dynamic in size, shape, and location), and other such alternatives). By moving such unobstructed sections, exposure of items 820 can be spread out, while maintaining the customer's ability to visually inspect items 820. Not only can such alternatives for unobstructed sections provide customers with the opportunity to visually inspect one or more of items 820, such alternatives can be "eye-catching" for customers, and so improve sales of the items displayed therein. Once again, information and its presentation in digital signage 830 can work in concert with such alternatives, in order to make product dispensing system 800 more visually appealing and noticeable.

Moreover, electronic gradient displaying enclosure 810 can also use multiple layers electrochromic materials, with each layer designed to address different wavelengths of electromagnetic radiation (e.g., one layer to address visible light, and another layer to address UV light). Further still, such layers can include light-emitting layers, to allow for signage such as that described herein to cover one or more walls of product dispensing system 800, and making digital signage 830 the size of an entire wall of electronic gradient displaying enclosure 810.

Figure 9:
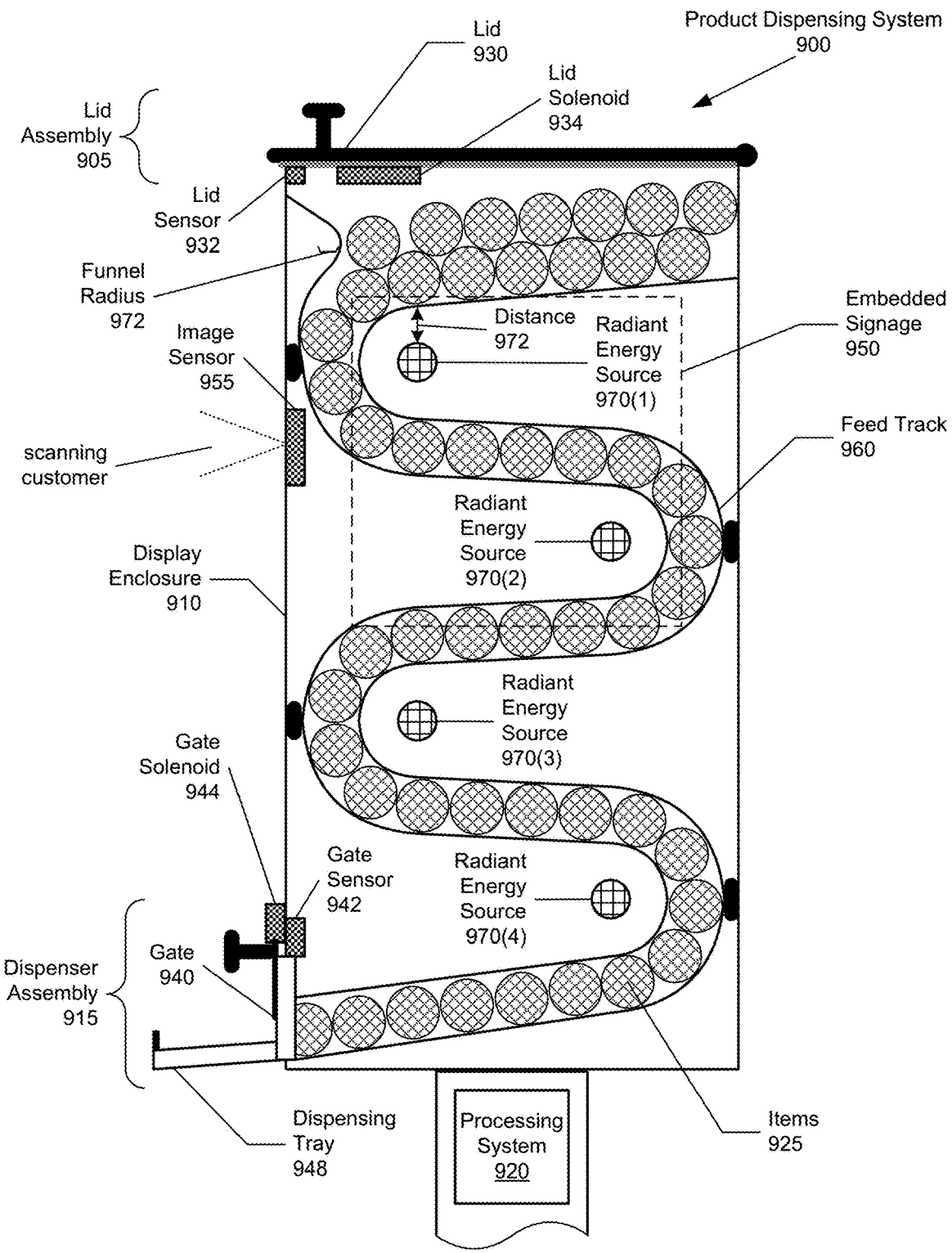
FIG. 9 is a simplified diagram illustrating a side view of components of a dispensing system, according to embodiments of methods and systems such as those disclosed herein.

FIG. 9 is a simplified diagram illustrating a side view of components of a product dispensing system, according to embodiments of methods and systems such as those disclosed herein. That being the case, FIG. 9 depicts a product dispensing system 900. As before, product dispensing system 900 includes a lid assembly 905, a display enclosure 910, a dispenser assembly 915, and a processing system 920, comparable in certain respects to those described in connection with previous figures. Also as before, displaying closure 910 provides for the loading and dispensing of one or more items (e.g., depicted in FIG. 9 as items 925.

Lid assembly 905 includes structures comparable to those described earlier, such as a lid 930, as noted. Lid assembly 905 can also include a lid sensor 932 and a lid solenoid 934. Similarly, gate assembly 915 includes a gate 940, a gate sensor 942, a gate solenoid 944, and a dispensing tray 948.

Such sensors and solenoids can be, for example, under the control of processing system 920. Lid sensor 932 allows processing system 922 detect when lid 930 has been opened or closed. Similarly, lid solenoid 934 allows processing system 922 control whether or not lid 930 can be opened (or in certain embodiments, even closed), and in so doing, facilitate the control over a clerk's ability to open lid 930. In a similar fashion, gate sensor 942 facilitates detection of the dispensing of one or more of items 925 by processing system 920 (e.g., software executed thereby). Conversely, gate solenoid 944 provides processing system 920 with the ability to control dispensing of items 925 (e.g., as by preventing the actuation of gate 940).

Also provided as part of displaying closure 910 is embedded signage 950, which, if implemented as a digital display, can display information under the control of processing system 920. An image sensor 955 is also provided as part of displaying closure 910, and allows processing system 922 process images of, for example, a customer wishing to purchase one or more of items 925. As will be appreciated in light of the present disclosure, image sensor 955 can be positioned in a manner that allows the scanning of a customer's face, as by positioning image sensor 955 at eye level, to the side of the front-facing one of embedded signage 950. In so doing, product dispensing system 900 provides for the simultaneous viewing of items 925 and embedded signage 950, as well as the scanning of the customer's face during such viewing. Such scanning facilitates comparison of the customer's facial features and those of an image in a government-issued identification card having a photograph of the holder imprinted thereon, in order to provide one (of possibly many) means of verifying the customer's identify (and so, in circumstances in which it is needed, the customer's age).

In the embodiment depicted in FIG. 9, items 925 are loaded into, stored in, and dispensed from a feed track 960 of displaying closure 910. Feed track 960 is designed to allow items 925 to roll through the channel therein, conveying the items from where the items are loaded (at lid assembly 905) to where the items are dispensed (delivering the items to dispenser assembly 915). That being the case, feed track can be, for example, curvilinear in shape, as depicted in FIG. 9, though other shapes (e.g., a series of straight ramps that drop the items from a low point of the given ramp onto a high point of the next ramp below). To this end, ones of items 925 loaded via lid assembly 905 are assisted in being fed through feed track 960 by an entry portion of the track 960 having a funnel radius 962. Funnel radius 962 is determined such that the opening in the loading area of the track 960 is unlikely to become blocked with the loading of additional ones of items 925.

Also included in displaying closure 910 in the embodiment shown in FIG. 9 are radiant energy sources (e.g., depicted as radiant energy sources 970(1)-(4), and referred to in the aggregate as radiant energy sources 970). As with other aspects of product dispensing system 900, radiant energy sources 970 can be controlled, for example, by processing system 920 and software executed thereby. As will be appreciated from FIG. 9, the curvature and other dimensions of feed track 960 can be selected to not only promote the smooth movement of items 925 through feed track 960, but also to properly expose items 925 two the radiant energy provided by radiant energy sources 970, in a manner that allows such irradiation to efficiently and effectively maintain and effect sterilization of items 925 (or their containers, as the case may be). To this end, a distance 972 can be maintained from a point in feed track 960 that is vertically above the given one of radiant energy sources 970, to a point in feed track 960 that is vertically below the given one of radiant energy sources 970. Further, in the manner noted in connection with ramp 648 and ramp angle 640 90 FIG. 6, the angle maintained between the horizontal sections of feed track 960 and horizontal can be determined such that items 925 not only move freely through feed track 960, but do not bear down on gate 940 with excessive force.

As noted, radiant energy sources 970 irradiate items 925 as those items travel through feed track 960. To encourage items 925 to receive substantially uniform and sufficient exposure to the radiant energy from radiant energy sources 970, such that a substantially sufficient level of disinfection of the items is effected. To this end, the bottom-most surface of feed track 960 can be covered with a material that provides a larger amount of friction than other surfaces within the track 960, in order to promote the rolling of items 925.

Radiant energy sources 970 can employ any number of different electromagnetic wavelengths. For example, a sufficient level of sterilization of certain items can be achieved using UV light (e.g., C-type ultraviolet light (also referred to as UVC)). Exposure of items 925 to UV radiation having wavelengths on the order of between about 200 nm and about 280 nm (C-type UV light, also referred to as UVC light), and preferably between about 235 nm and about 313 nm, with wavelengths between about 265 nm and about 270 nm being most preferable, to provide effective disinfection (e.g., having a reduction factor of over about 99%). Humidity can reduce the effectiveness of germicidal UV radiation. To this end, if a reference dose attains a survival of 37%, an adequate dose corresponds to 99.9% or 99.99% inactivation, though it is typically sufficient to provide 99% inactivation.

However, cannabis products are also sensitive to UV light, typically, and can degrade when exposed to such wavelengths, with such exposure resulting in damage to desirable compounds contained therein (e.g., damage to the tetrahydrocannabinol (THC) and aromatic compounds such as terpenes contained therein). Thus, it can be desirable to use containers appropriate to such exposure to protect the cannabis products contained therein. Additionally, product dispensing system 900 can be configured to reduce the exposure of such cannabis products by implementing pricing, display, and other techniques, such as those mentioned. Such control can also allow disinfectant operations implemented by radiant energy sources 970 to be turned off (or at least the last one (or more) such sources) to reduce exposure to the UV light. However, depending on the length of time items 925 are exposed, disinfection may be compromised to some extent.

While exposure control can be used to some extent, containers that block UV radiation (and preferably, all wavelengths of light (e.g., A-type UV (UVA), B-type UV (UVB), and UVC, as well as visible wavelengths) provide greater assurance that the cannabis products contained therein are protected. However, while relatively high levels of radiation at UV wavelengths and so provide a high level of disinfection, such protection comes at the cost of allowing customers to visually inspect such products (both because of the containers and the fact that humans should not be exposed to such radiation). It will be appreciated that, in light of the present disclosure, the use of UV disinfections need for such shielding makes signage such as that described herein advantageous. This is also true of implementations that employ RFID tagging.

However, depending on the embodiment and the items being dispensed, it is possible to darken the sections of display enclosure 910 in which exposure is occurring (e.g., strongly expose items just loaded and darken those areas until sufficient exposure is achieved), while leaving other sections (e.g., lower sections of display enclosure 910) unobstructed, such that items having been sufficiently exposed can be viewed. If items are not dispensed quickly enough (or other situations, such as lid 930 being left open for too long), items can be re-exposed by darkening the portion of display enclosure 910 in which such items currently sit, exposing those items sufficiently, and lightening that portion of display enclosure 910 to again allow visual inspection of the now-disinfected items. Thus, at least a portion of items 925 can remain visible, while others of items 925 are disinfected. It will be further appreciated that the disinfection of the surfaces of items 925 can be expected to require less exposure than disinfection of the internal portions of items 925 (indeed, if the packaging and/or composition/structure of items 925 admits to disinfection by such radiant energy, and the ingredients of items 925 are not overly sensitive to such radiant energy). Such considerations may militate toward the use of other forms of radiant energy, as is now described.

In the alternative (or in combination with a lower level than might otherwise be needed), such disinfection can be accomplished through the use of microwave radiation sources. As will be appreciated in light of the present disclosure, the less UV radiation is used, the longer a given item (whether in a container that does not protect from UV and visible light, or not packaged in a container (e.g., individually-rolled marijuana cigarettes)) can remain in product dispensing display 900.

Such microwave radiation can be at a frequency of between about 1.5 GHz and about 6.5 GHz, and is preferably at a frequency of between about 2.05 GHz and about 2.85 GHz. More preferably, such microwave radiation is at a frequency of between about 2.30 GHz and about 2.60 GHz, while a frequency of 2.45 GHz is most preferable. The radiant energy delivered to each item is a function of the speed with which items 925 move through feed track 960, the typical amount of rolling items experience in feed track 960, distance 972 (and whether that varies between radiant energy sources), the number of radiant energy sources, and other such factors. However, radiant exposure of items 925 to microwave radiation should be on the order of between about 105 and about 205 mW-s/cm$^2$, and preferably between about 130 and about 180 mW-s/cm$^2$, with a radiant exposure of 155 mW-s/cm$^2$ being most preferable. Such radiant exposure is expected to completely inactivate bacterial cultures, mycobacteria, viruses, and various types of spores within 60 seconds to 5 minutes, depending on the organism of interest. As will be appreciated in light of the present disclosure, factors such as item size, composition, and whether the item is packaged in a container can affect UV/microwave disinfection.

Example Mechanisms for Item Dispensing and Loading

Figure 10A:
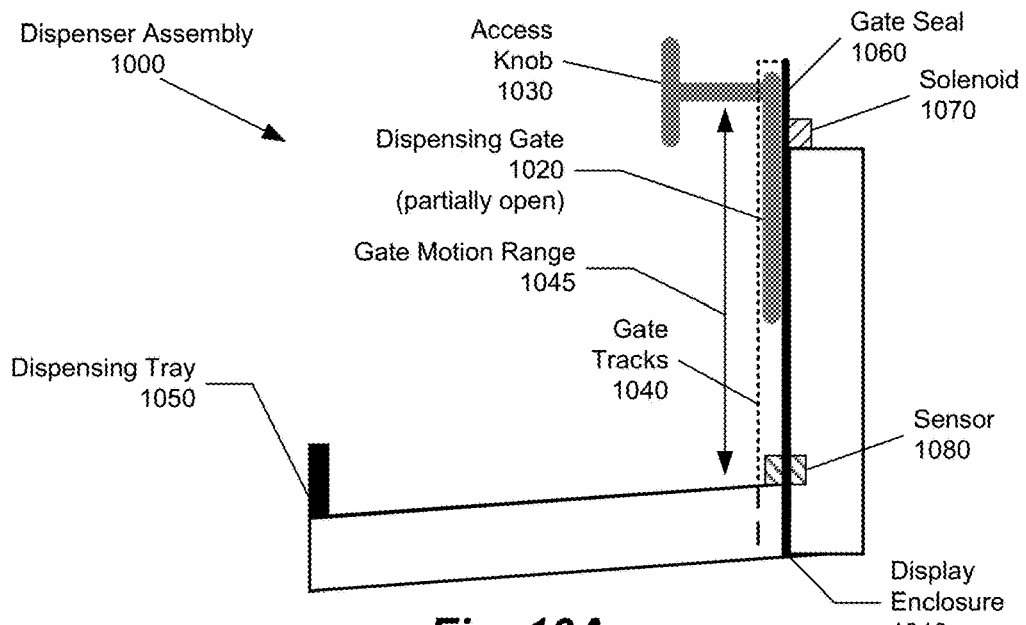
FIG. 10A is a simplified diagram illustrating a side view of an example of a gate mechanism of a dispenser assembly, according to embodiments of methods and systems such as those disclosed herein.

FIG. 10A is a simplified diagram illustrating a side view of an example of a dispenser assembly of a dispensing system, according to embodiments of methods and systems such as those disclosed herein. That being the case, FIG. 10A depicts a side view of a dispenser assembly 1000. As with the dispenser assemblies described earlier herein, dispenser assembly 1000 is part of (or integrated with) the front wall of a display enclosure 1010, for example. Dispenser assembly 1000 includes a dispensing gate 1020, to which is attached and actuated by an access knob 1030. Dispensing gate 1020 is actuated by the motion of access knob 1030, which slides dispensing gate 1020 vertical he within gate tracks were 1040, as depicted as gate motion range 1045. By actuating dispensing gate 1020, a customer or other user is able to dispense one or more items stored in display enclosure 1010 into a dispensing tray 1050. Gate tracks 1040 not only serve to guide the motion of dispensing gate 1020, but also maintain contact between dispensing gate 1020 and a gate seal 1060. In maintaining such contact, dispensing gate 1020 and gate seal 1060 help to maintain the environment within display enclosure 1010. That said, attention should be paid to the sealing provided by such mechanisms, given that dispensing gate 1020 slides against gate seal 1060. Advantageously, however, the dispensing operation may lead to less air being exchanged between display enclosure 1010 and the ambient environment.

Dispenser assembly 1000 also includes a solenoid 1070 and a sensor 1080. As noted earlier herein, solenoid 1070 and sensor 1080 can be interfaced to an IOT interface and/or other such computing system (e.g., processing system 750 of FIG. 7). In interfacing solenoid 1070 and sensor 1080 in this manner, the dispensing of items can be detected and controlled. For example, under the control of a processing system, solenoid 1070 can prevent or allow actuation of dispensing gate 1020. Similarly, sensor 1080 can detect actuation of dispensing gate 1020 and/or the dispensing of each of one or more items. Further, while shown as separate units in the embodiment depicted in FIG. 10A, it will be appreciated that solenoid 1070 and sensor 1080 can be integrated into a single unit or module, in other embodiments.

Figure 10B:
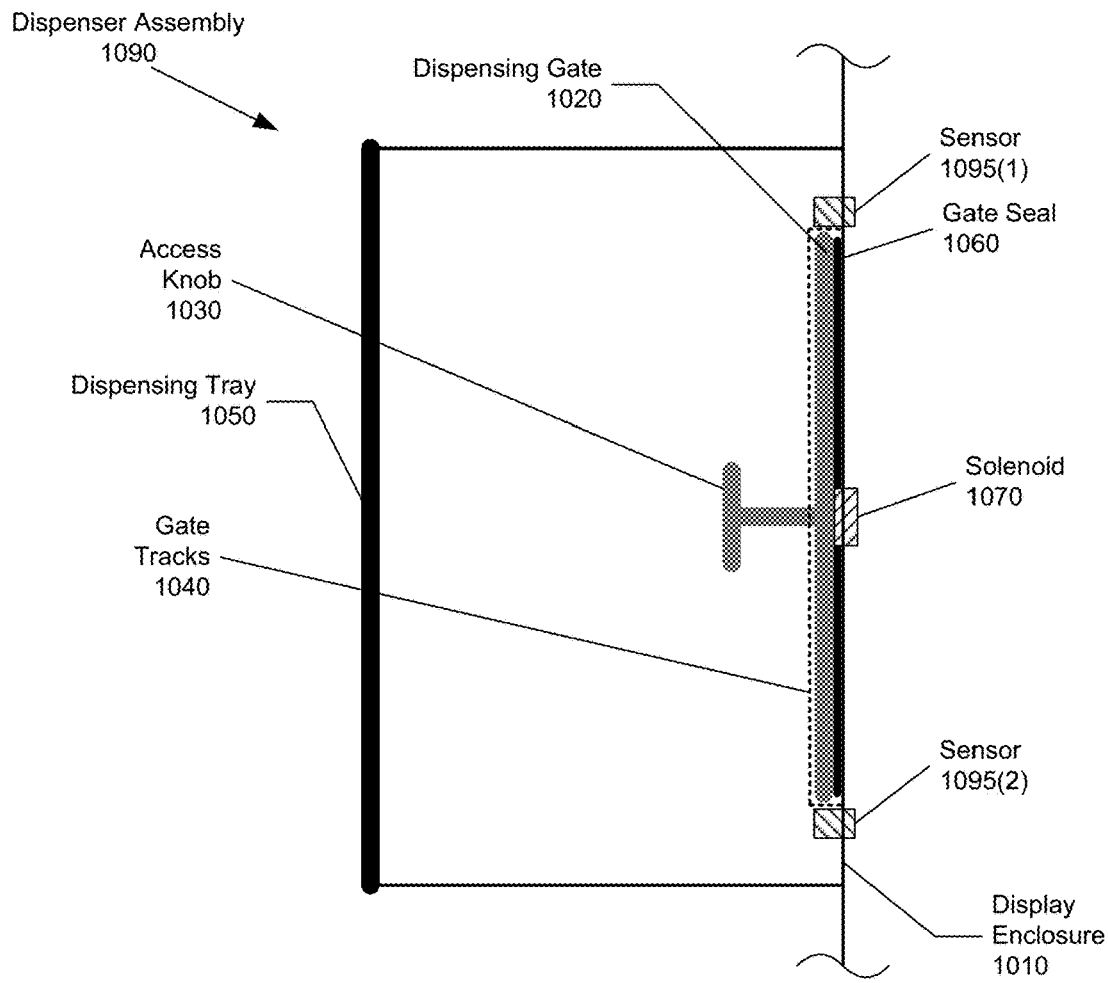
FIG. 10B is a simplified diagram illustrating a top view of an example of a gate mechanism of a dispenser assembly, according to embodiments of methods and systems such as those disclosed herein.

FIG. 10B is a simplified diagram illustrating a top view of an example of a dispenser assembly of a dispensing system, according to embodiments of methods and systems such as those disclosed herein. Here again, FIG. 10B depicts a dispenser assembly 1090, which is comparable to dispenser assembly 1000, but which is now viewed from above. As before, dispenser assembly 1090 is part of (or integrated with) a wall (e.g., a front wall) of display enclosure 1010. Dispenser assembly 1090 includes a dispensing gate 1020, to which is attached and actuated by an access knob 1030 dispensing gate 1020 is actuated by the motion of access knob 1030, which slides dispensing gate 1020 vertical he within gate tracks were 1040, as depicted as gate motion range 1045. By actuating dispensing gate 1020, a customer or other user is able to dispense one or more items stored in display enclosure 1010 into a dispensing tray 1050. Gate tracks 1040 not only serve to guide the motion of dispensing gate 1020, but also maintain contact between dispensing gate 1020 and a gate seal 1060. In maintaining such contact, dispensing gate 1020 and gate seal 1060 help to maintain the environment within display enclosure 1010.

Dispenser assembly 1090 also includes a solenoid 1070 and sensors 1095(1)-(2) (referred to in the aggregate as sensors 1095). As noted, solenoid 1070 and sensors 1095 can be interfaced to an IOT interface and/or other such computing system (e.g., processing system 750 of FIG. 7). In interfacing solenoid 1070 and sensors 1095 in this manner, the dispensing of items can be detected and controlled. Again, under the control of a processing system, solenoid 1070 can prevent or allow actuation of dispensing gate 1020. While sensors 1095 provide for the detection of the actuation of dispensing gate 1020, embodiments such as that depicted in FIG. 10B is directed to detecting the dispensing of one or more items (e.g., as by such items breaking a visible or infrared light beam therebetween).

Figure 11A:
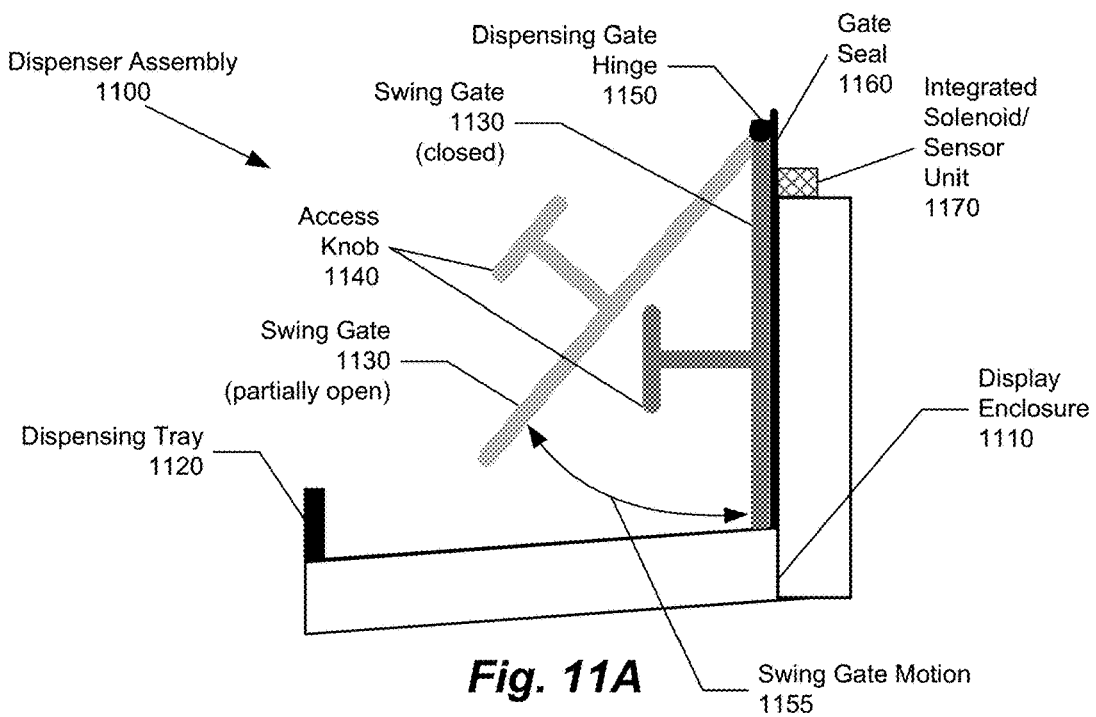
FIG. 11A is a simplified diagram illustrating a side view of an example of a swing gate mechanism for a dispenser assembly of a dispensing system, according to embodiments of methods and systems such as those disclosed herein.

FIG. 11A is a simplified diagram illustrating a side view of an example of a swing gate mechanism for a dispenser assembly of a dispensing system, according to embodiments of methods and systems such as those disclosed herein. That being the case, FIG. 11A depicts a side view of a dispenser assembly 1100. Dispenser assembly 1100 is included as part of a display enclosure 1110, and includes a dispensing tray 1120, into which items are dispensed. However, in contrast to dispenser assemblies 1000 and 1090, dispenser assembly 1100 is implemented using a swing gate 1130, which is actuated using an access knob 1140. When actuated, swing gate 1130 swings on a dispensing gate hinge 1150, through its range of motion (e.g., depicted as swing gate motion 1155). When swing gate 1130 is opened, one or more items can be dispensed into dispensing tray 1120. When closed, swing gate 1130 preserves the environment within display enclosure 1110 by resting against gate seal 1160. Contact between the surfaces of swing gate 1130 and gate seal 1160 help to maintain the proper environment within display enclosure 1110. Given that the substantially flat surface of swing gate 1130 held with relative firmness against the relatively compliant sealing material of gate seal 1160 (e.g., by spring-loading dispensing gate hinge 1150), a dispenser assembly such as dispenser assembly 1100 can provide greater control over the environment within display enclosure 1110, if swing gate 1130 remains closed a large part of the time. However, the dispensing operation may lead to an exchange of more air with the ambient environment, if items are dispensed frequently.

Dispenser assembly 1100 also includes integrated solenoid/sensor unit 1170. As noted earlier, integrated solenoid/sensor unit 1170 integrates the functionality of the solenoid(s) and sensor(s) described earlier, providing the ability of a computer system associated with product dispensing display to control and monitor dispensing of items therefrom. Such is the case with respect to dispenser assembly 1100 as depicted in FIGS. 11A and 11B.

Figure 11B:
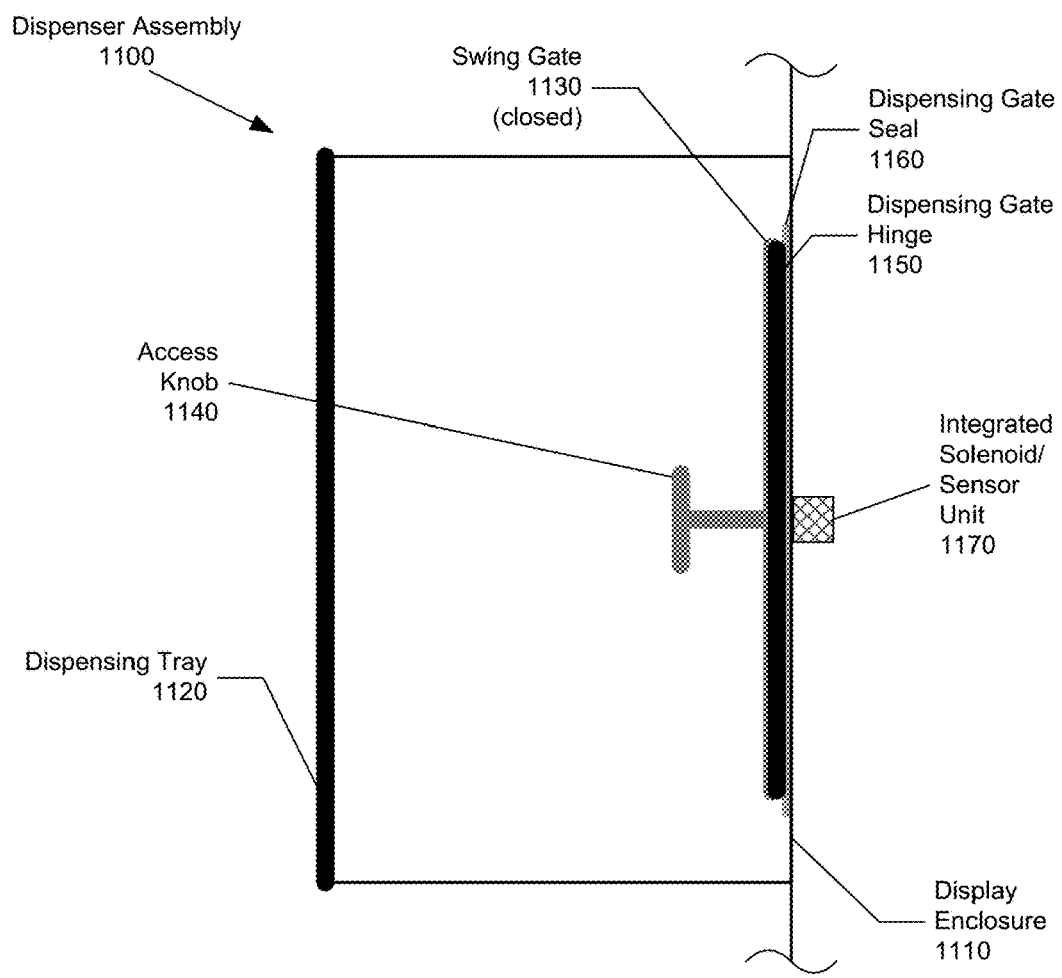
FIG. 11B is a simplified diagram illustrating a top view of an example of a swing gate mechanism for a dispenser assembly of a dispensing system, according to embodiments of methods and systems such as those disclosed herein.

FIG. 11B is a simplified diagram illustrating a top view of an example of a swing gate mechanism for a dispenser assembly of a dispensing system, according to embodiments of methods and systems such as those disclosed herein. That being the case, FIG. 11B again depicts dispenser assembly 1100, but now viewed from above. As before, dispenser assembly 1100 is included as part of a display enclosure 1110, and includes dispensing tray 1120. In the manner noted in connection with FIG. 11A, dispenser assembly 1100 is implemented using swing gate 1130, actuated using access knob 1140. When actuated, swing gate 1130 swings on dispensing gate hinge 1150, through its range of motion. When swing gate 1130 is opened, one or more items can be dispensed into dispensing tray 1120. When closed, swing gate 1130 preserves the environment within display enclosure 1110 by resting against gate seal 1160. Contact between the surfaces of swing gate 1130 and gate seal 1160 help to maintain the proper environment within display enclosure 1110. Dispenser assembly 1100 also includes integrated solenoid/sensor unit 1170.

Figure 12:
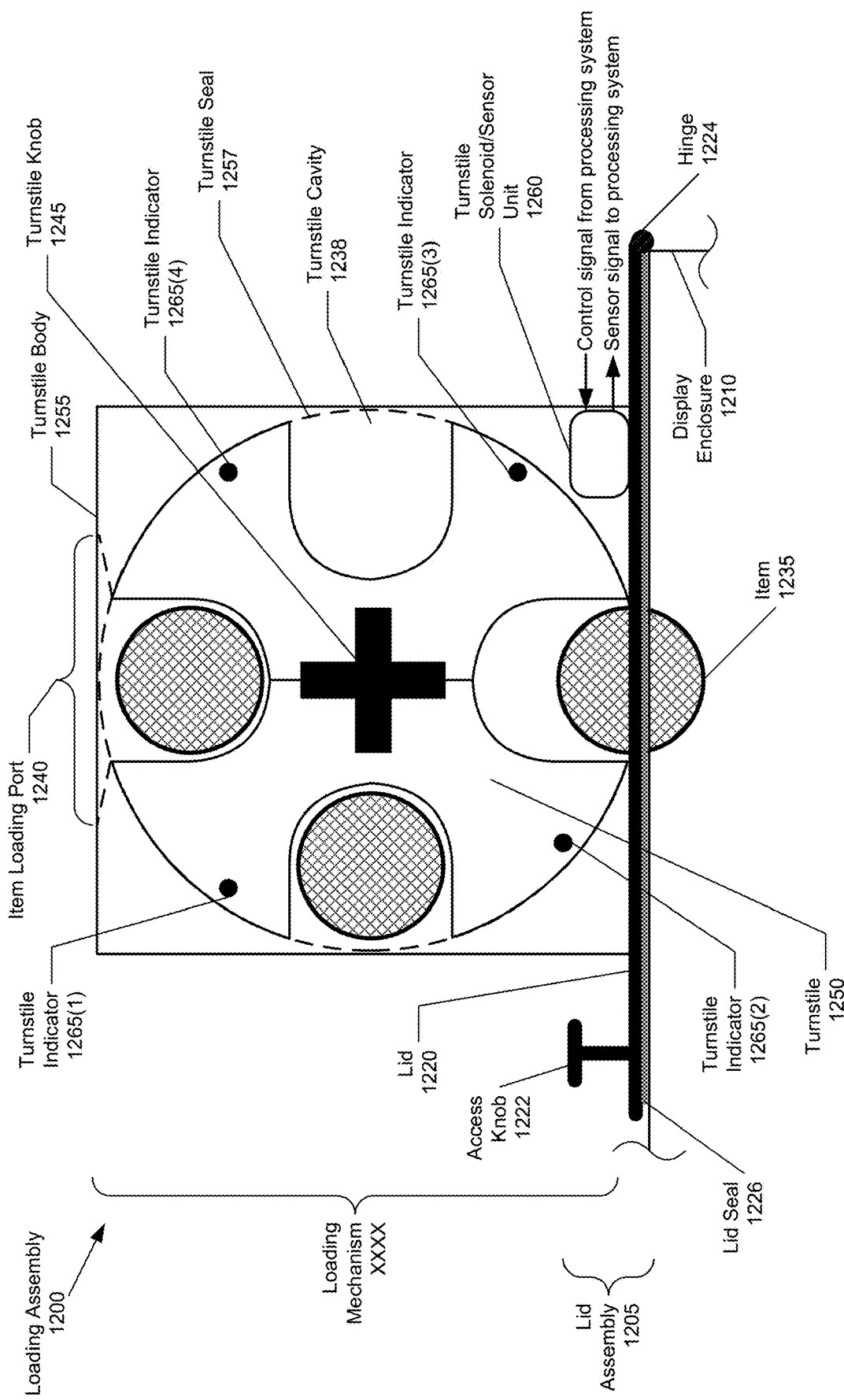
FIG. 12 is a simplified diagram illustrating a side view of an example of a loading mechanism of a product dispensing system, according to embodiments of methods and systems such as those disclosed herein.

FIG. 12 is a simplified diagram illustrating a side view of an example of a loading mechanism of a product dispensing system, according to embodiments of methods and systems such as those disclosed herein. That being the case, FIG. 12 depicts a loading assembly numeral 1200. As depicted in other described presented, loading assembly numeral 1200 can include a lid assembly 1205 disposed, for example, at the top of a display enclosure 1210. Lid assembly 1205, in turn, includes a lid 1220, which can be actuated through the use of access knob 1222, which causes lid 1220 (as well as mechanisms attached thereto) to pivot about a hinged 1224, and so provide direct access to the interior of display enclosure 1210. As before, in order to maintain the proper environment within display enclosure 1210, with 1220 seals against lid seal 1226, when lid 1220 is closed.

Also included in loading assembly 1200 is a loading mechanism 1230. Loading mechanism 1230 provides a mechanism by which items such as item 1235 can be loaded into display enclosure 1210, without opening lid 1220 and so maintaining proper environment within display enclosure 1210. Loading mechanism 1230 employees a turnstile that can be used, in fact, for both loading and/or dispensing mechanisms. A user such as a clerk employs loading mechanism 1230 by inserting items such as item 1235 into display enclosure 1210 through the insertion of such items into a turnstile cavity (e.g., an example of which is depicted as a turnstile cavity 1238) via an item loading port 1240, and the turning of a turnstile knob 1245, which rotates turnstile 1250 within a turnstile body 1255. Loading mechanism 1230 can also provide a ratchet mechanism to prevent an item from being returned to item loading port 1240, and so force a user such as a clerk loading items using loading mechanism 1230 to complete the loading of such an item. A seal (e.g., a turnstile seal 1257) can also be provided to further ensure that display enclosure 1210 remains hermetically sealed. So long as the seal between turnstile 1250 and turnstile seal 1257, a loading assembly (or a dispenser assembly) such as loading assembly 1200 can provide greater control over the environment within display enclosure 1210. This is particularly true where the rate at which items are dispensed from (or loaded into) display enclosure 1210 is frequent, as a result of relatively little exchange of air between the display enclosure and the ambient environment.

In a product dispensing display employing computer control, a turnstile solenoid/sensor unit 1260 can be included in loading mechanism 1230. A sensor of turnstile solenoid/sensor unit 1260 can sense rotation of turnstile 1250 by way of, for example, the passing of a turnstile indicator (e.g., depicted as turnstile indicators 1265(1)-(4), and referred to in the aggregate as turnstile indicators 1265) sufficiently near turnstile solenoid/sensor unit 1260 to cause the rotation to be sensed. Upon sensing such rotation, turnstile solenoid/sensor unit 1260 sends a sensor signal to the processing system of the product dispensing display. In so doing, information regarding the loading of items via loading mechanism 1230 can be maintained by such processing system. Similarly, such a processing system can control the rotation of turnstile 1250 by sending the appropriate signals (e.g., control signals from the processing system) to turnstile solenoid/sensor unit 1260, thereby activating a solenoid of turnstile solenoid/sensor unit 1260 in the desired manner. Further, one or more additional sensors can be included in turnstile 1250 (and more particularly, in turnstile cavity thereof), in order to the processing system to determine whether another item has been placed in the particular turnstile cavity in question. In so doing, potentially in combination with control of turnstile 1250 by way of turnstile solenoid/sensor unit 1260, such a processing system would be able to determine when turnstile 1250 should be allowed to rotate (e.g., preventing rotation of turnstile 1250 unless an item into the turnstile cavity in question).

Example Processes for Display Enclosure Operation

Figure 13:
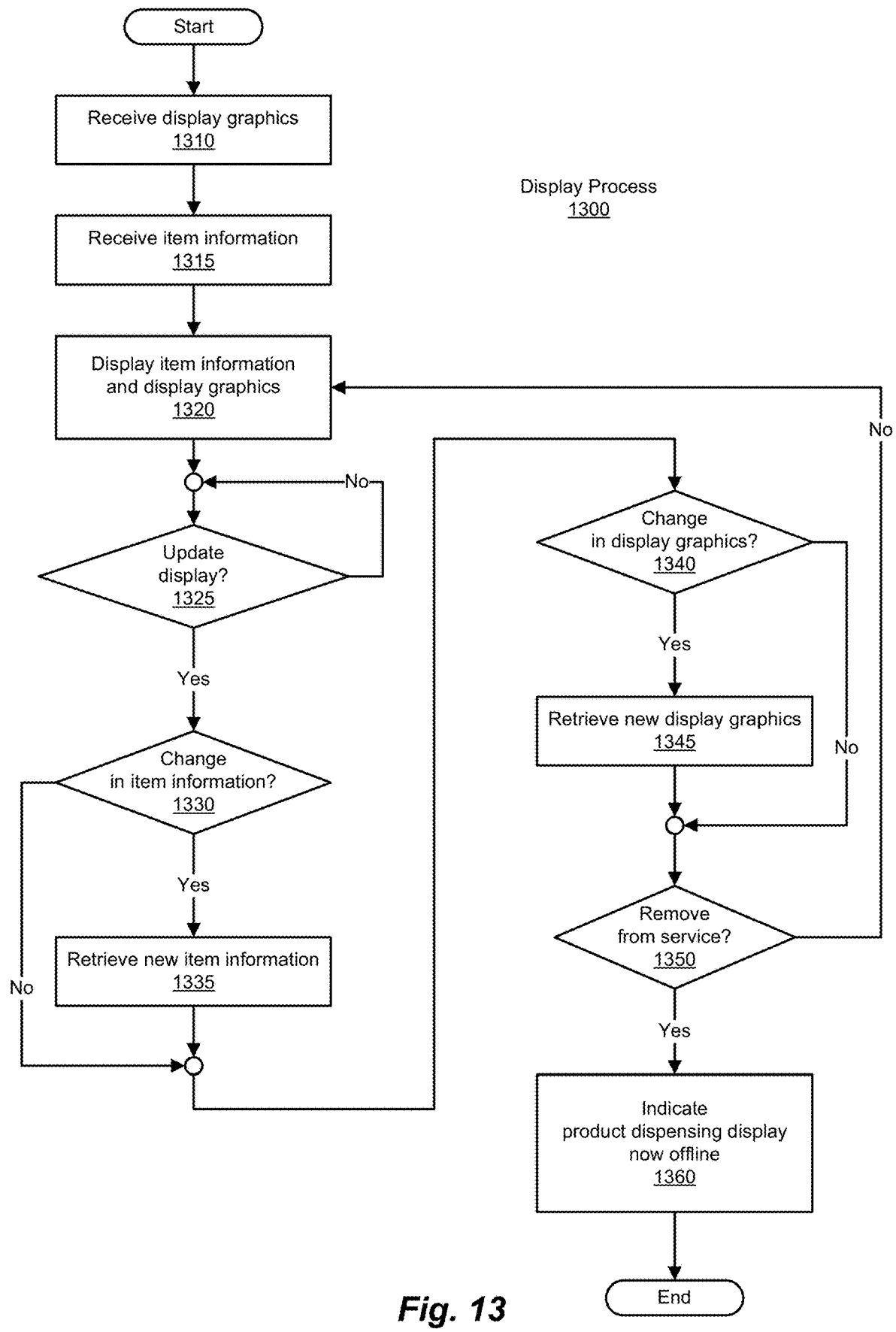
FIG. 13 is a flow diagram illustrating an example of display process, according to embodiments of methods and systems such as those disclosed herein.

FIG. 13 is a flow diagram illustrating an example of display process, according to embodiments of methods and systems such as those disclosed herein. That being the case, FIG. 13 depicts a display process 1300. In the depicted embodiment, display process 1300 begins with the receipt of display graphics (1310). Such display graphics can be sized appropriately to the signage area desired (e.g., such as signage 615 of FIG. 6), or can be sized to completely cover one or more walls of the display enclosure in question (or to some intermediate size). Further, under the control of a processing system such as processing system 840 of FIG. 8, a display covering an entire wall or large portion thereof of a display enclosure such as electronic gradient displaying closure 810 can also allow for the display of display graphics within gradient sections thereof (e.g. gradient sections 850) in a manner that not only protects the items stored therein (e.g., items 820) while allowing for the viewing of such items, but is also modified to both fit one or more unobstructed sections (e.g., unobstructed section 860) and to display such display graphics (as well as item information) in an eye-catching and aesthetically pleasing manner (e.g., as by displaying display graphics that mimic a colorful aquarium, where bubbles floating through the "aquarium's" "water" are unobstructed sections that allow viewing of the items within, or a cloud-filled sky, where the "clouds" are the unobstructed sections).

Display process 1300 also receives item information (1315). As will be appreciated light of the present disclosure, such item information can include pricing information, descriptive information, sale information (e.g., a duration for which the pricing information will remain in force), and other such information. Certain of such information can be obtained by the product dispensing display's processing system by way of the RFID tags described elsewhere herein.

Display process can receive not only information for display (e.g., item information, such as pricing information, and/or display graphics), such information can be accompanied by shading information (with regard to the areas to be shaded, the size of the unobstructed section(s), the gradient to be effected (e.g., from one percentage transmission level (e.g., 10%) to another percentage transmission level (e.g., 90%)), in order to appropriately protect the items from overexposure to visible or UV light, for example. The product dispensing display's processing system can receive such information from resource planning system, or the product dispensing display's processing system can make such determinations itself (e.g., based on the amount of ambient light, as detected by the product dispensing display's image sensor).

Once the requisite display graphics and item information been received, such display graphics and item information are displayed in the aforementioned manner (1320). Next, a determination is made as to whether the display enclosure's display is to be updated (1325). Until such time as the display is to be updated, display process 1300 loops, awaiting the detection of such changes (1325). Once an update is detected, display process 1300 proceeds with making a determination as to whether there has been a change in the information regarding the items (1330). If a change in such information has occurred, new item information is retrieved (1335). Once the new item information has been retrieved (1335) (or a determination made that no such changes occurred (1330)), a determination is made as to whether one or more changes have occurred with respect to the display graphics to be displayed (1340). If changes to the display graphics have been made, the new display graphics are retrieved (1345). Once the new display graphics have been retrieved (1345) (or a determination made that the display graphics employed need not be changed (1340)), a determination is made as to whether the product dispensing display in question should be removed from service (e.g., as might result from the need of the given product dispensing display to be serviced) (1350). If the given product dispensing display is to remain in service, display process 1300 loops to displaying the (possibly new) item information and (possibly new) display graphics (1320). In the alternative, the product dispensing display's processing system can indicate to the appropriate server or other computing device that the product dispensing display is now off-line (1360). Display process 1300 then concludes.

Figure 14A:
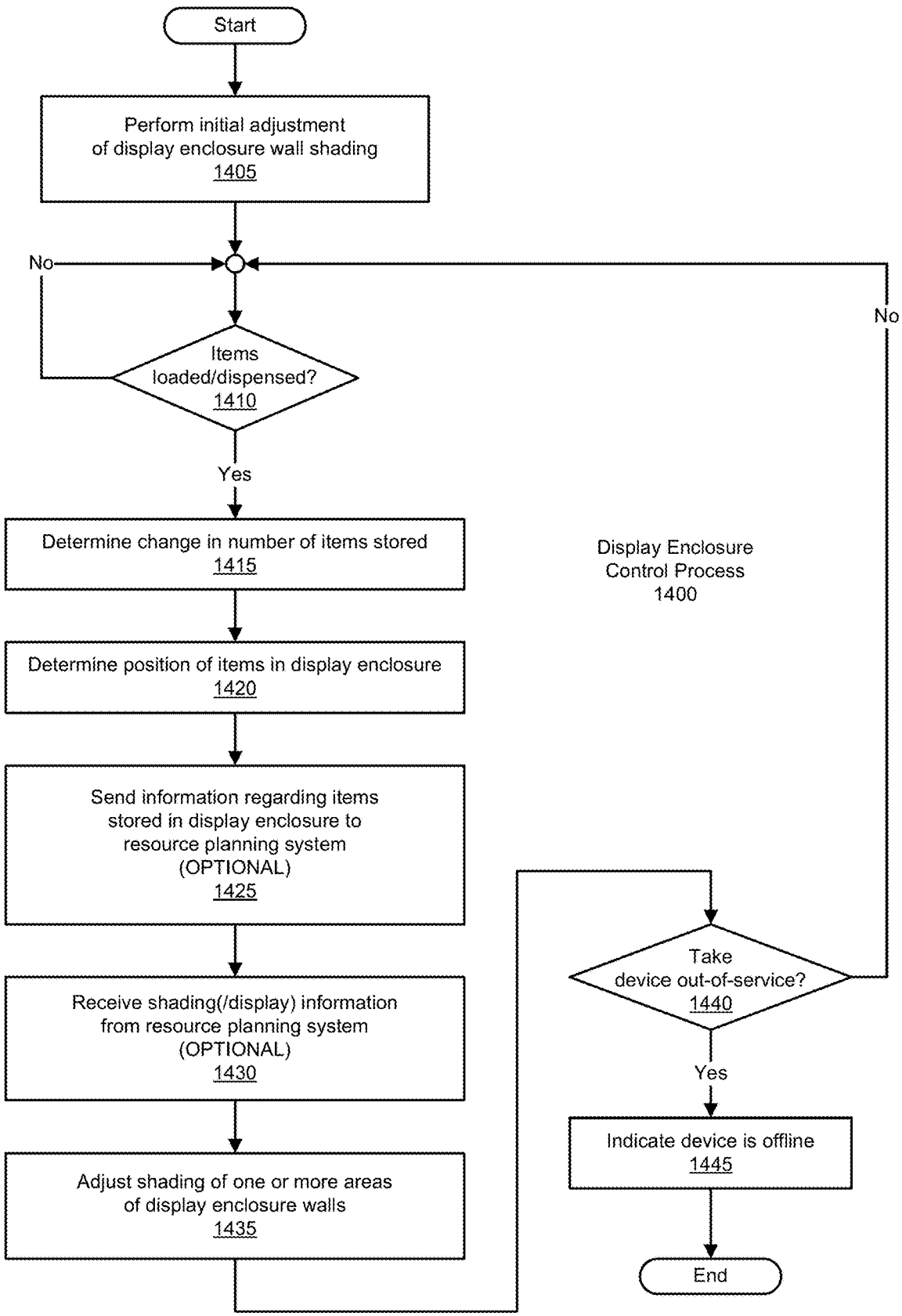
FIG. 14A is a flow diagram illustrating an example of a display enclosure control process, according to embodiments of methods and systems such as those disclosed herein.

FIG. 14A is a flow diagram illustrating an example of a display enclosure control process, according to embodiments of methods and systems such as those disclosed herein. FIG. 14A thus depicts a display enclosure control process 1400. In the embodiment depicted in FIG. 14A, display enclosure control process 1400 begins by performing an initial adjustment of display enclosure wall shading (1405). Such shading adjustments can be made to set all walls of the given product dispensing display's display enclosure to a nominal value based on the ambient level of light sensed by the product dispensing display's image sensor, for example. Such shading adjustments can also take into consideration the level of exposure appropriate to the items being dispensed (e.g., the items' sensitivity to light), the rate at which such items are being (or have been or are expected to be) dispensed, and other such factors. Subsequently, a determination is made as to whether one or more items have been loaded or dispensed (1410). Such a determination can be made by way of one or more of the sensors described earlier herein. While the number of items stored in the product dispensing display remains constant, display enclosure control process 1400 loops, awaiting such changes.

Upon detection of the loading and/or dispensing of one or more items, display enclosure control process 1400 makes a determination as to the number of items stored in the product dispensing display enclosure (1415). Having made a determination as to the number of items originally stored in the product dispensing display's display enclosure, as well as any changes thereto, display enclosure control process 1400 can determine the position of the items within the display enclosure, and optionally, the length of time each of those items has been in the display enclosure (1420). Such information can, optionally, be sent to a resource planning system, in the case in which such determinations are to be considered by the remote system, rather than just the product dispensing display system's processing system (or in the alternative thereto) (1425). In such embodiments, shading and/or display information can (optionally) be received from such systems in response thereto, for use in the shading of the display enclosure and the display of item information thereon (1430). Using such information (or having determined such information itself), the processing system of the product dispensing display enclosure can then adjust the shading of one or more areas of the display enclosure's walls and/or information presented on the product dispensing display's signage (1435).

As before, a determination is then made as to whether the product dispensing display in question is to remain in service (1440). If the product dispensing display is to remain in service, display enclosure control process 1400 loops to awaiting the detection of further items being loaded and/or dispensed from the product dispensing display (1410). In the alternative, an indication is made that the product dispensing display is now off-line (1445) and display enclosure control process 1400 concludes.

Figure 14B:
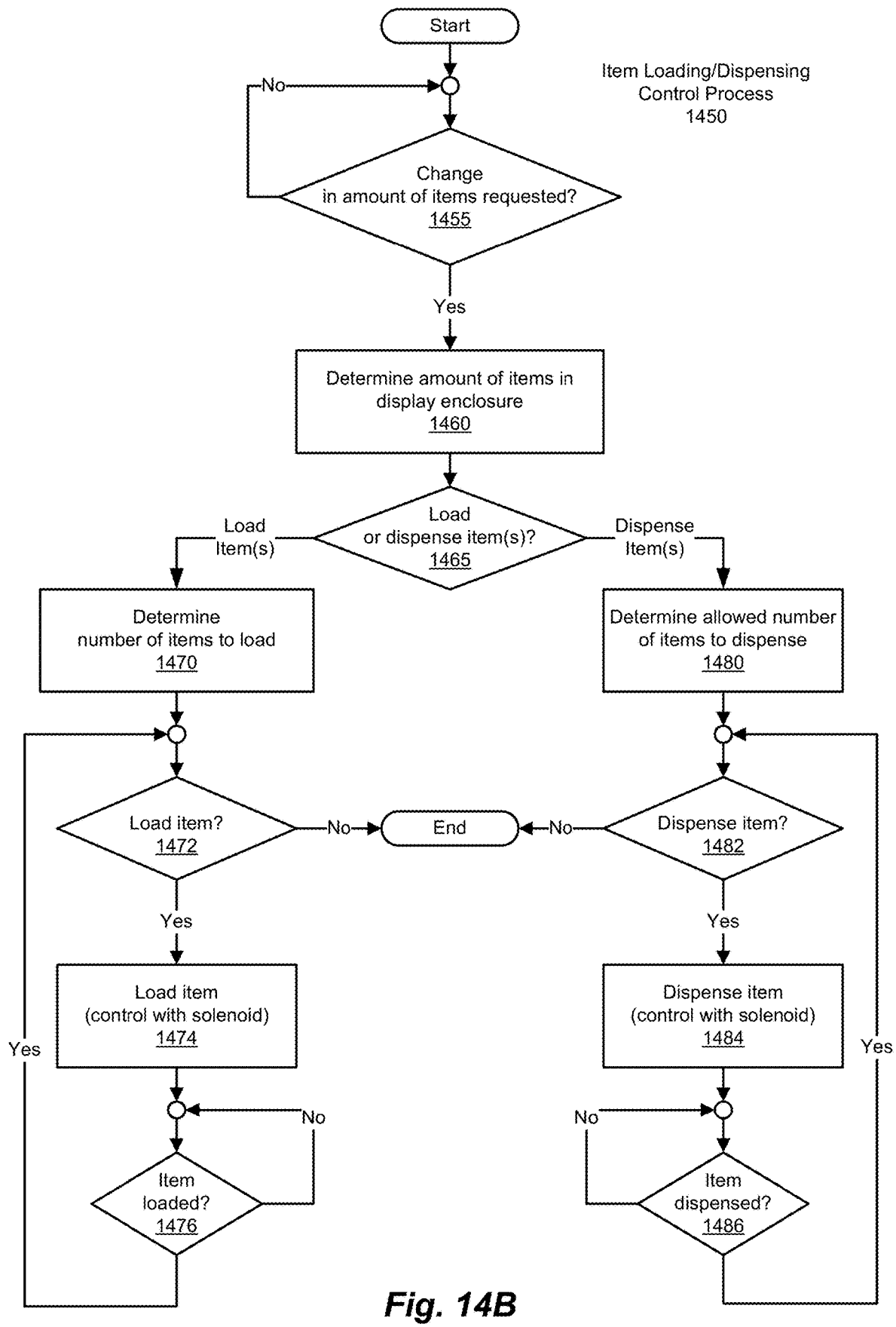
FIG. 14B is a flow diagram illustrating an example of a dispensing control process, according to embodiments of methods and systems such as those disclosed herein.

FIG. 14B is a flow diagram illustrating an example of a dispensing control process, according to embodiments of methods and systems such as those disclosed herein. FIG. 14B thus depicts an item loading/dispensing control process 1450. Item loading/dispensing control process 1450 begins with a determination as to whether there has been a request for a change in the number of items stored in the given product dispensing display (1455). Until such time as the product dispensing display (its processing system) receives such a request, item loading/dispensing control process 1450 iterates, awaiting such a request. Such a request might be generated through a resource planning system such as that mentioned above, by way of a determination made by the processing system (e.g., where sensors such as those described sense an attempt to load or dispense one or more items), or other such mechanism.

Upon such request, a determination is made as to the number of items that are currently stored in the product dispensing display's display enclosure (1460). Such a determination can be made by way of a sensor such as item sensor 660 of FIG. 6. A determination is then made as to whether one or more items are to be loaded or dispensed (1465). This can be accomplished by the processing system receiving such information in a request, or can be determined based on input signals from the aforementioned sensors.

In the case in which one or more items are loaded, a determination is made as to the number of items that will be loaded (1470). Such a determination can include the consideration of historical data regarding sales (how quickly items are typically dispensed (e.g., based on a per unit time (minute, hour, day, week, etc.) measure), so expected rate, during a comparable period of time (day of the week, season, month, etc.)), the period of time since the product dispensing display was last loaded, the number of items currently stored in the product dispensing display, typical shelf-life (unpackaged, loosely packaged, moderate packaging, airtight packaging) packaged items can be expected to exhibit, exposure of unpackaged items to conditions within the display enclosure, the conditions within the display enclosure, and other such factors. These factors can be determined (e.g., as described earlier), and the loading of items controlled to maintain a desirable environment within the display enclosure for the items, and so facilitate the proper storage of the items in question.

A determination is then made as to whether another item is to be loaded (1472). In fact, this determination is made to determine whether the desired number of items have been loaded. If further items remain to be loaded, an item is loaded (e.g., as by a clerk or other such individual), which can be controlled with a solenoid and sensor, in a manner such as that described previously (1474). A determination is then made as to whether the item has indeed been successfully loaded (1476). Until it is determined that the item has been successfully loaded into the display enclosure (e.g., as by the aforementioned sensors), item loading/dispensing control process 1450 iterates, awaiting such an eventuality. Once the item in question has been successfully loaded, item loading/dispensing control process 1450 proceeds with making a determination as to whether another item remains to be loaded (1472). This process continues until the requisite number of items have been loaded, at which point, item loading/dispensing control process 1450 concludes.

In the alternative, where one or more items are to be dispensed (1465), a determination is made as to the allowable number of items to dispense (1480). Factors similar to or the same as those discussed with regard to the loading of items can be considered. Also in a manner comparable to that just discussed with regard to loading, item loading/dispensing control process 1450 proceeds with making a determination as to whether another item is to be dispensed (1482). In the case in which another item is to be dispensed, item loading/dispensing control process 1450 (e.g., under the control of the given processing system) allows another item to be dispensed (e.g., to a customer or other such individual) (1484). As before, such dispensing can be controlled with one or more solenoids, in the manner described earlier herein, for example. A determination is then made as to whether the item in question has been successfully dispensed (1486). In the case in which the item has not yet been successfully dispensed, item loading/dispensing control process 1450 iterates, awaiting dispensing of the item in question completed upon successful completion of such dispensing, item loading/dispensing control process is to the determination as to whether additional items remain to be dispensed (1482). At this juncture, once all such items have been dispensed, item loading/dispensing control process 1450 concludes.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus is illustrated for ease of understanding, it should be understood that the system buses may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 150), one or more applications, and data. Examples of such computing and network environments are described below with reference to FIGS. 15 and 16.

Figure 15:
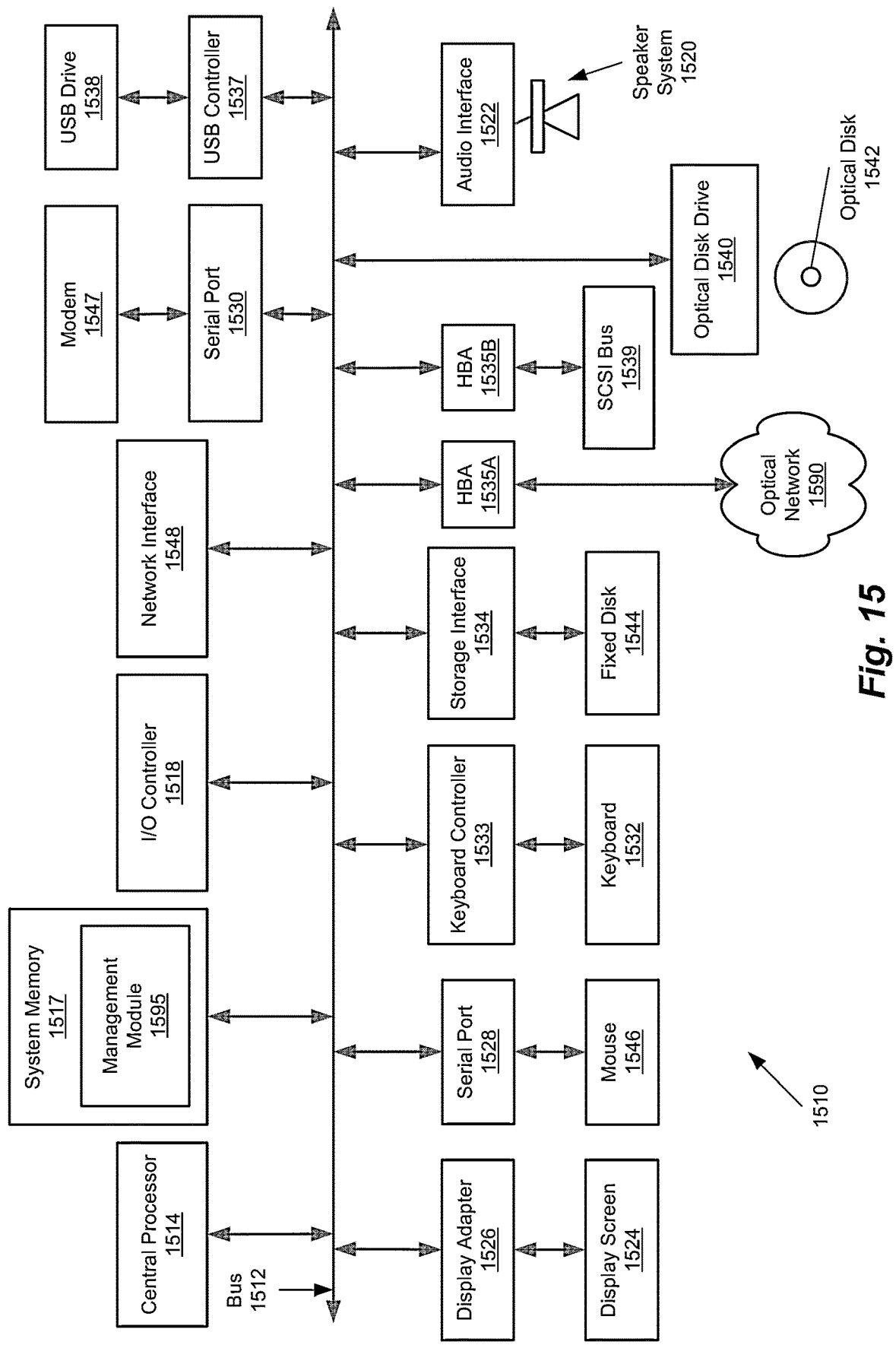
FIG. 15 is a block diagram depicting a computer system suitable for implementing embodiments of methods and systems such as those disclosed herein.

FIG. 15 depicts a block diagram of a computer system 1510 suitable for implementing aspects of the systems described herein. Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a USB controller 1537 operative to receive a USB drive 1538, a host bus adapter (HBA) interface card 1535A operative to connect with a optical network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1510 are generally stored on and accessed from a computer-readable storage medium, such as a hard disk drive (e.g., fixed disk 1544), an optical drive (e.g., optical drive 1540), a universal serial bus (USB) controller 1537, or other computer-readable storage medium.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like. Also depicted as part of computer system 1510 is a product dispensing display management module 1595, which is resident in system memory 1517 and provides functionality and operations comparable to the management processes described earlier herein.

Many other devices or subsystems (not shown) may be connected in a similar manner (e.g., document scanners, digital cameras and so on). Conversely, all of the devices shown in FIG. 15 need not be present to practice the systems described herein. The devices and subsystems can be interconnected in different ways from that shown in FIG. 15. The operation of a computer system such as that shown in FIG. 15 will be readily understood in light of the present disclosure. Code to implement portions of the systems described herein can be stored in computer-readable storage media such as one or more of system memory 1517, fixed disk 1544, optical disk 1542, or USB drive 1538. The operating system provided on computer system 1510 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
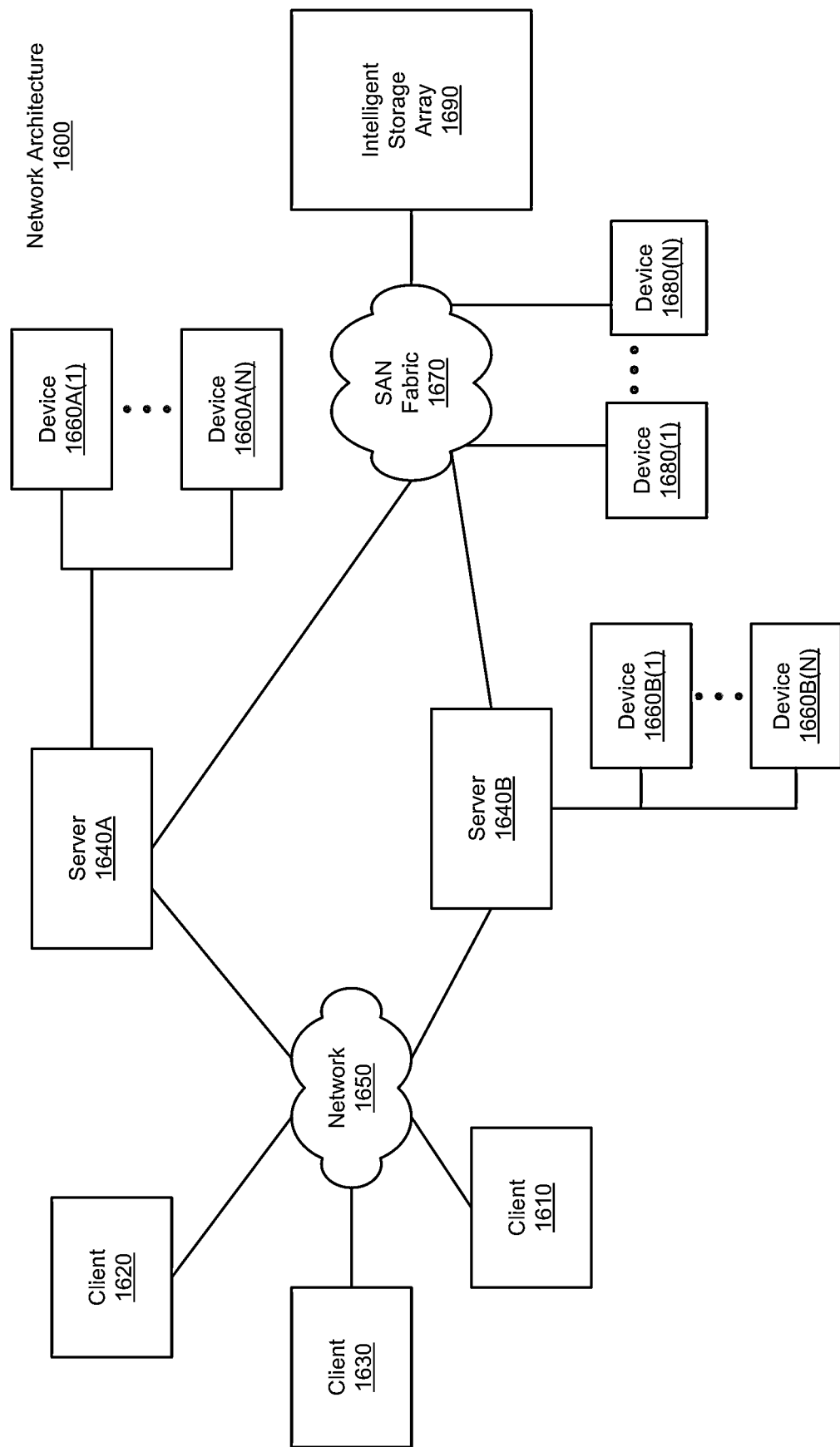
FIG. 16 is a block diagram depicting a network architecture suitable for implementing embodiments of methods and systems such as those disclosed herein.

FIG. 16 is a block diagram depicting a network architecture 1600 in which client systems 1610, 1620 and 1630, as well as storage servers 1640A and 1640B (any of which can be implemented using computer system 1610), are coupled to a network 1650. Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation. SAN fabric 1670 supports access to storage devices 1680(1)-(N) by storage servers 1640A and 1640B, and so by client systems 1610, 1620 and 1630 via network 1650. An intelligent storage array 1690 is also shown as an example of a specific storage device accessible via SAN fabric 1670.

With reference to computer system 1510, modem 1547, network interface 1548 or some other method can be used to provide connectivity from each of client computer systems 1610, 1620 and 1630 to network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1310). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
a housing, wherein
the apparatus is configured to store and dispense an item by virtue of the housing comprising a plurality of walls that form an internal volume,
the item comprises a substantially circular cross-section,
the plurality of walls comprise a front wall, a back wall, a first side wall, and a second side wall, and
each wall of the plurality of walls meets another wall of the plurality of walls at one or more edges of the each wall of the plurality of walls and one or more edges of the another wall of the plurality of walls, such that the plurality of walls further form a top opening at a top edge of the each wall of the plurality of walls and a bottom opening at a bottom edge of the each wall of the plurality of walls;
a top, positioned at the top opening;
a base, positioned at the bottom opening;
a dispenser assembly, positioned at the front wall of the plurality of walls and operable to dispense the item from the housing, at least in part, by virtue of the dispenser assembly being configured to dispense the item due to the substantially circular cross-section of the item; and
embedded signage, wherein
at least one wall of the plurality of walls is at least partially translucent, such that at least a portion of the item is at least partially visible through the at least one wall of the plurality of walls from a point external to the housing, and
the embedded signage is positioned with respect to the at least one wall of the plurality of walls, such that information on the embedded signage is at least partially visible from the point external to the housing.

2. The apparatus of claim 1, wherein
the at least one wall of the plurality of walls is at least partially translucent by virtue of being transparent, and
the embedded signage comprises at least one of
a holder, affixed to an interior surface of the at least one wall of the plurality of walls and configured to hold printed material, or
digital signage.

3. The apparatus of claim 1, wherein
a loading mechanism, mechanically coupled to the housing and/or the top such that the loading mechanism is operable to facilitate loading of the item into the housing,
wherein
the item comprises a substantially circular cross-section by virtual of comprising a substantially cylindrical shape, and
the loading mechanism is configured to facilitate loading of the item into the housing as a result of being configured to facilitate movement of the item due to the substantially cylindrical shape of the item.

4. The apparatus of claim 3, wherein
the top, the base, the housing, the loading mechanism, and the dispenser assembly are configured to maintain one or more environmental parameters of an environment within the internal volume.

5. The apparatus of claim 3, wherein
the loading mechanism is a lid assembly comprising a lid, and
the lid, upon being closed, seals against a seal affixed to each of top edge of the each wall of the plurality of walls, such that an environmental parameter of an environment within the internal volume is substantially maintained.

6. The apparatus of claim 5, wherein
the lid assembly is mechanically coupled at the top edge of one or more walls of the plurality of walls by a hinge that rotatably couples the lid, at a back edge of the lid, to a top edge of the back wall.

7. The apparatus of claim 1, wherein
the top, the base, and the housing are configured to maintain one or more environmental parameters of an environment within the internal volume.

8. The apparatus of claim 7, further comprising:
a loading mechanism, wherein
the top is positioned at the top edge of the each wall of the plurality of walls by virtue of being affixed to the top edge of the each wall of the plurality of walls,
the base is positioned at the bottom edge of the each wall of the plurality of walls by virtue of being affixed to the bottom edge of the each wall of the plurality of walls,
the loading mechanism is mechanically coupled to the housing and/or the top such that the loading mechanism is operable to facilitate loading of the item into the housing, and
the loading mechanism and the dispenser assembly are configured to maintain the one or more environmental parameters of the environment within the internal volume.

9. The apparatus of claim 1, wherein the top comprises:
a lid assembly, wherein
the lid assembly is mechanically coupled at a top edge of one or more walls of the plurality of walls, such that the lid assembly is operable to facilitate loading of an item into the housing and sealing of the top opening.

10. The apparatus of claim 9, wherein
the lid assembly comprises a turnstile, and
the turnstile is configured to substantially maintain an environmental parameter of an environment within the internal volume by virtue of being configured to rotate against a seal of a turnstile housing.

11. The apparatus of claim 9, wherein
the top, the base, the housing, the lid assembly, and the dispenser assembly are configured to maintain one or more environmental parameters of an environment within the internal volume.

12. The apparatus of claim 1, further comprising:
a computer processing system; and
a radio frequency identification tag sensor, wherein
the radio frequency identification tag sensor and the computer processing system are coupled to one another,
the radio frequency identification tag sensor is configured to receive a signal from a radio-frequency identification tag associated with the item and, in response to receiving the signal, provide information regarding the item to the computer processing system, and
in response to receipt of the information, the computer processing system is configured to identify the item.

13. The apparatus of claim 1, further comprising:
a computer processing system;
one or more environmental sensors, wherein
the one or more environmental sensors are communicatively coupled to the computer processing system,
the top, the base, the housing, and the dispenser assembly are configured to maintain one or more environmental parameters of an environment within the internal volume, and
the one or more environmental sensors are configured to communicate one or more values of corresponding ones of the one or more environmental parameters to the computer processing system; and
one or more mechanisms, wherein
the one or more mechanisms are communicatively coupled to the computer processing system,
each of the one or more mechanisms are configured to receive a corresponding signal from the computer processing system,
the each of the one or more mechanisms are further configured to actuate, in response to receipt of the corresponding signal,
the computer processing system is configured to further maintain the one or more environmental parameters by controlling the one or more mechanisms using the one or more values of the corresponding ones of the one or more environmental parameters.

14. The apparatus of claim 13, wherein
the one or more environmental sensors comprise at least one of a temperature sensor, or a humidity sensor, and
the one or more mechanisms comprise at least one of a fan, a valve, a heater, a humidification source, or a dehumidifier.

15. The apparatus of claim 14, wherein
the top, the base, the housing, and the embedded signage form a display enclosure, and the valve is controlled by the computer processing system to maintain the one or more environmental parameters by
when open, facilitating interchange of air within the display enclosure and an ambient environment by coupling the internal volume and an external environment, and
when closed, preventing the interchange of the air within the display enclosure and the ambient environment.

16. The apparatus of claim 13, further comprising:
a radio-frequency identification sensor, wherein
the radio-frequency identification sensor is communicatively coupled to the computer processing system, and
the computer processing system is further configured to control the one or more mechanisms, using information retrieved from a radio-frequency identification tag associated with the item.

17. The apparatus of claim 1, wherein
the internal volume is rectangular in shape, when viewed from above the housing, and
the base comprises a dispensing ramp that is configured to feed the item to an opening in the front wall of the plurality of walls by virtue of a front edge of the dispensing ramp being located substantially adjacent to a bottom edge of the opening.

18. The apparatus of claim 17, wherein the dispenser assembly comprises at least one of a dispensing gate slidably actuated in a gate guide, a swing gate coupled at a top edge of the opening, or a turnstile.

19. The apparatus of claim 1, further comprising:
a feed track, wherein
the top comprises a lid assembly,
the lid assembly is configured to receive the item,
the feed track is configured to receive the item from the lid assembly, and
the feed track is configured to deliver the item to the dispenser assembly.

20. The apparatus of claim 19, further comprising:
one or more radiant energy sources, wherein
the feed track is of a curvilinear shape,
the feed track comprises a channel that is configured to convey the item,
each of the one or more radiant energy sources are configured to produce radiant energy and are located at a corresponding curve of the feed track, and
the channel is configured to promote rolling of the item, such that the item receives substantially uniform and sufficient exposure to the radiant energy from radiant energy sources to effect a substantially sufficient level of disinfection.

* * * * *